US010616631B2

(12) United States Patent
Choi et al.

(10) Patent No.: US 10,616,631 B2
(45) Date of Patent: Apr. 7, 2020

(54) ELECTRONIC APPARATUS AND METHOD OF OPERATING THE SAME

(71) Applicant: SAMSUNG ELECTRONICS CO., LTD., Suwon-si (KR)

(72) Inventors: Yoon-hee Choi, Seoul (KR); Tae-ung Jung, Hwaseong-si (KR); Hae-dong Yeo, Suwon-si (KR); Wei Wen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/665,797

(22) Filed: Aug. 1, 2017

(65) Prior Publication Data

US 2018/0035149 A1 Feb. 1, 2018

Related U.S. Application Data

(60) Provisional application No. 62/369,384, filed on Aug. 1, 2016, provisional application No. 62/369,324, filed (Continued)

(30) Foreign Application Priority Data

Jul. 21, 2017 (KR) ........................ 10-2017-0092738

(51) Int. Cl.
*H04N 21/2668* (2011.01)
*H04N 21/414* (2011.01)

(Continued)

(52) U.S. Cl.
CPC ....... *H04N 21/2668* (2013.01); *H04N 21/414* (2013.01); *H04N 21/432* (2013.01);

(Continued)

(58) Field of Classification Search
None
See application file for complete search history.

(56) References Cited

U.S. PATENT DOCUMENTS 6,075,575 A * 6/2000 Schein ............... H04N 5/44543 345/684
7,266,832 B2 9/2007 Miller (Continued)

FOREIGN PATENT DOCUMENTS

EP 2763427 A1 8/2014
EP 2919478 A1 9/2015

(Continued)

OTHER PUBLICATIONS

International Search Report and Written Opinion dated Nov. 21, 2017 by International Searching Authority in International Application No. PCT/KR2017/008274 (PCT/ISA/220, 210, & 237).

(Continued)

*Primary Examiner* — Ricky Chin
(74) *Attorney, Agent, or Firm* — Sughrue Mion, PLLC

(57) ABSTRACT

An electronic apparatus including a communication interface, a display, a memory configured to store one or more instructions, and a processor configured to execute the one or more instructions stored in the memory, wherein, when executed, the one or more instructions cause the processor to receive, based on a fingerprint extracted from content displayed on the display, information of a first broadcast channel corresponding to the content from a server and recognize the first broadcast channel corresponding to the content, in response to determining that a broadcast schedule of a replacement target existing advertisement is included in a broadcast schedule of the first broadcast channel, download a replacement advertisement from the server based on a start point of the replacement target existing advertisement, and reproduce the replacement advertisement at an (Continued)

advertisement time of the replacement target existing advertisement of the first broadcast channel.

20 Claims, 20 Drawing Sheets

Related U.S. Application Data on Aug. 1, 2016, provisional application No. 62/369,276, filed on Aug. 1, 2016.

(51) Int. Cl.

| | |
|---|---|
| ***H04N 21/432*** | (2011.01) |
| ***H04N 21/44*** | (2011.01) |
| ***H04N 21/442*** | (2011.01) |
| ***H04N 21/458*** | (2011.01) |
| ***H04N 21/643*** | (2011.01) |
| ***H04N 21/81*** | (2011.01) |

(52) U.S. Cl.

CPC . *H04N 21/44008* (2013.01); *H04N 21/44222* (2013.01); *H04N 21/458* (2013.01); *H04N 21/643* (2013.01); *H04N 21/812* (2013.01)

(56) References Cited

U.S. PATENT DOCUMENTS

| | | | | |
|---|---|---|---|---|
| 7,421,376 | B1 | 9/2008 | Caruso et al. | |
| 8,891,813 | B2 | 11/2014 | Radhakrishnan et al. | |
| 9,092,520 | B2 | 7/2015 | Yang et al. | |
| 2001/0042246 | A1* | 11/2001 | Yuen | H04N 21/4332 725/1 |
| 2002/0042914 | A1* | 4/2002 | Walker | G06Q 30/02 725/36 |
| 2003/0005445 | A1* | 1/2003 | Schein | H04N 5/44543 725/51 |
| 2003/0131356 | A1* | 7/2003 | Proehl | H04N 5/44543 725/58 |
| 2003/0202772 | A1* | 10/2003 | Dow | G06K 9/00711 386/248 |
| 2006/0267995 | A1* | 11/2006 | Radloff | G11B 27/105 345/530 |
| 2008/0235090 | A1 | 9/2008 | Lundstrom et al. | |
| 2008/0244659 | A1* | 10/2008 | Stallings | H04N 5/4403 725/52 |
| 2009/0034807 | A1 | 2/2009 | Caruso et al. | |
| 2009/0077580 | A1 | 3/2009 | Konig et al. | |
| 2009/0144159 | A1 | 6/2009 | Bashyam | |
| 2009/0157391 | A1 | 6/2009 | Bilobrov | |
| 2010/0043022 | A1 | 2/2010 | Kaftan | |
| 2011/0162010 | A1* | 6/2011 | Ellis | G06F 17/30029 725/40 |
| 2013/0055304 | A1* | 2/2013 | Kirby | H04N 21/2365 725/31 |
| 2013/0088645 | A1 | 4/2013 | Lee et al. | |
| 2014/0366064 | A1* | 12/2014 | Moreau | H04N 5/44543 725/45 |
| 2016/0127759 | A1 | 5/2016 | Jung et al. | |
| 2017/0094351 | A1* | 3/2017 | Gordon | H04N 21/44213 |

FOREIGN PATENT DOCUMENTS

| | | | |
|---|---|---|---|
| KR | 1020090125527 | A | 12/2009 |
| WO | 2004080073 | A2 | 9/2004 |

OTHER PUBLICATIONS

Communication dated Jan. 18, 2019, issued by the European Patent Office in counterpart European Application No. 17837213.2.

* cited by examiner

FIG. 12

20
SERVER
PROCESSOR
CAPTURE RECOGNITION TARGET IMAGE OR RECOGNITION TARGET VIDEO FRAME
CAPTURE REFERENCE IMAGE OR REFERENCE VIDEO FRAME
FINGERPRINT EXTRACTION
FINGERPRINT MATCHING
STORAGE
IMAGE OR VIDEO DB
FINGERPRINT DB
COMMUNICATION INTERFACE
RECOGNITION TARGET IMAGE OR VIDEO/CAPTURE DATA
MATCHING RESULT
10
ELECTRONIC APPARATUS

151

| 0 | 1 | 2 | 3 | 4 |
|---|---|---|---|---|
| 5 | 6 | i | i+1 | … |
| … | … | … | … | … |
| … | … | … | … | MxN−1 |

152

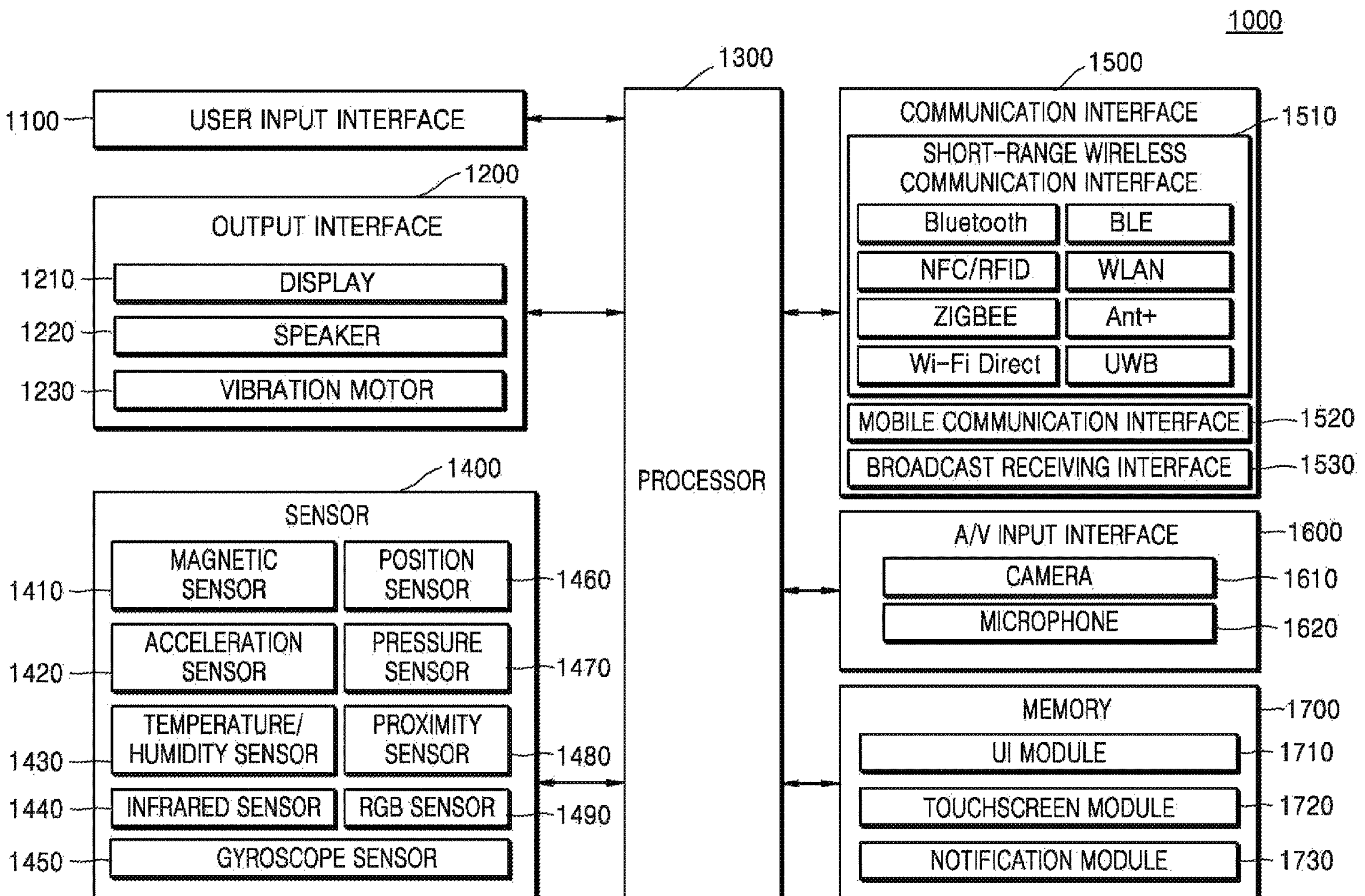
FIG. 17
1000
1100
USER INPUT INTERFACE
1200
OUTPUT INTERFACE
1210
DISPLAY
1220
SPEAKER
1230
VIBRATION MOTOR
1400
SENSOR
1410
MAGNETIC SENSOR
1460
POSITION SENSOR
1420
ACCELERATION SENSOR
1470
PRESSURE SENSOR
1430
TEMPERATURE/ HUMIDITY SENSOR
1480
PROXIMITY SENSOR
1440
INFRARED SENSOR
1490
RGB SENSOR
1450
GYROSCOPE SENSOR
1300
PROCESSOR
1500
COMMUNICATION INTERFACE
1510
SHORT-RANGE WIRELESS COMMUNICATION INTERFACE
Bluetooth
BLE
NFC/RFID
WLAN
ZIGBEE
Ant+
Wi-Fi Direct
UWB
MOBILE COMMUNICATION INTERFACE
1520
BROADCAST RECEIVING INTERFACE
1530
A/V INPUT INTERFACE
1600
CAMERA
1610
MICROPHONE
1620
MEMORY
1700
UI MODULE
1710
TOUCHSCREEN MODULE
1720
NOTIFICATION MODULE
1730

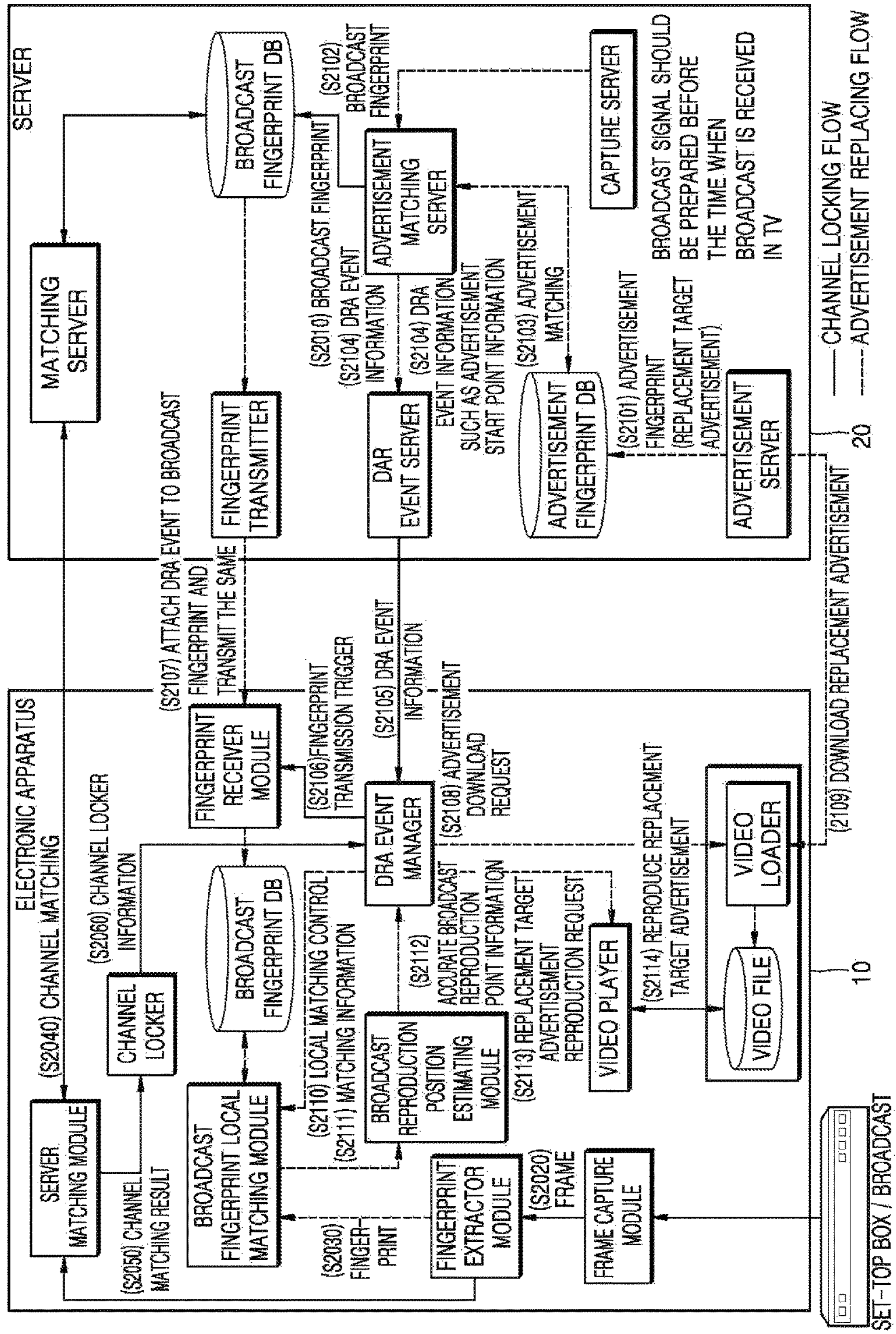
FIG.20
SERVER
MATCHING SERVER
BROADCAST FINGERPRINT DB
(S2102) BROADCAST FINGERPRINT
CAPTURE SERVER
ADVERTISEMENT MATCHING SERVER
(S2010) BROADCAST FINGERPRINT
(S2104) DRA EVENT INFORMATION
(S2104) DRA EVENT INFORMATION SUCH AS ADVERTISEMENT START POINT INFORMATION
(S2103) ADVERTISEMENT MATCHING
FINGERPRINT TRANSMITTER
DAR EVENT SERVER
ADVERTISEMENT FINGERPRINT DB
(S2101) ADVERTISEMENT FINGERPRINT (REPLACEMENT TARGET ADVERTISEMENT)
ADVERTISEMENT SERVER
BROADCAST SIGNAL SHOULD BE PREPARED BEFORE THE TIME WHEN BROADCAST IS RECEIVED IN TV
CHANNEL LOCKING FLOW
ADVERTISEMENT REPLACING FLOW
20
(S2107) ATTACH DRA EVENT TO BROADCAST FINGERPRINT AND TRANSMIT THE SAME
(S2106) FINGERPRINT TRANSMISSION TRIGGER
(S2105) DRA EVENT INFORMATION
(S2108) ADVERTISEMENT DOWNLOAD REQUEST
(2109) DOWNLOAD REPLACEMENT ADVERTISEMENT
ELECTRONIC APPARATUS
(S2040) CHANNEL MATCHING
(S2060) CHANNEL LOCKER INFORMATION
SERVER MATCHING MODULE
CHANNEL LOCKER
FINGERPRINT RECEIVER MODULE
BROADCAST FINGERPRINT DB
DRA EVENT MANAGER
(S2110) LOCAL MATCHING CONTROL
(S2111) MATCHING INFORMATION
(S2112) ACCURATE BROADCAST REPRODUCTION POINT INFORMATION
(S2113) REPLACEMENT TARGET ADVERTISEMENT REPRODUCTION REQUEST
(S2114) REPRODUCE REPLACEMENT TARGET ADVERTISEMENT
VIDEO LOADER
VIDEO FILE
VIDEO PLAYER
10
(S2050) CHANNEL MATCHING RESULT
BROADCAST FINGERPRINT LOCAL MATCHING MODULE
BROADCAST REPRODUCTION POSITION ESTIMATING MODULE
(S2030) FINGER-PRINT
FINGERPRINT EXTRACTOR MODULE
(S2020) FRAME
FRAME CAPTURE MODULE
SET-TOP BOX / BROADCAST

ELECTRONIC APPARATUS AND METHOD OF OPERATING THE SAME

CROSS-REFERENCE TO RELATED APPLICATIONS

This application claims the benefit of U.S. Provisional Application No. 62/369,384 filed on Aug. 1, 2016, in the US Patent Office, U.S. Provisional Application No. 62/369,276 filed on Aug. 1, 2016, in the US Patent Office, and U.S. Provisional Application No. 62/369,324 filed on Aug. 1, 2016, in the US Patent Office, and claims priority from Korean Patent Application No. 10-2017-0092738, filed on Jul. 21, 2017, in the Korean Intellectual Property Office, the disclosures of which are incorporated herein by reference in their entireties.

BACKGROUND

1. Field

Methods and apparatuses consistent with exemplary embodiments relate to an electronic apparatus for replacing in real time an advertisement provided according to a broadcast program and a method of operating the same.

2. Description of Related Art

Because a television (TV) connected to the Internet may receive data from a data network such as an Internet network, viewers may receive not only digital broadcast content but also multimedia contents. As such, due to the use of various smart devices such as a smart TV and a TV connected to the Internet, content providers may provide more abundant content, advertisements, and interactive content.

However, when viewing a particular channel at a particular time point by using a TV, a smart TV, or a TV connected to the Internet, a viewer may have no choice but to view a scheduled advertisement on a broadcast schedule of a broadcast channel in the same way due to the characteristics of broadcasting. Thus, instead of uniformly providing a scheduled advertisement on a broadcast schedule, an electronic apparatus such as a TV may need to provide a suitable advertisement for a user of the electronic apparatus at a suitable time.

SUMMARY

Provided is an electronic apparatus that may provide a replacement advertisement at an accurate point by beforehand recognizing a start point of a replacement target existing advertisement, according to an exemplary embodiment.

Provided is an electronic apparatus that may recognize a broadcast channel viewed by a user and may accurately determine a reproduction position of the recognized broadcast channel, according to an exemplary embodiment.

Provided is an electronic apparatus that may allow a user to efficiently control the electronic apparatus by providing an execution screen for control of the electronic apparatus on a replacement advertisement when the execution screen for control of the electronic apparatus is called while the replacement advertisement is provided in the electronic apparatus, according to an exemplary embodiment.

Additional aspects will be set forth in part in the description which follows and, in part, will be apparent from the description, or may be learned by practice of the presented exemplary embodiments.

According to an aspect of an exemplary embodiment, an electronic apparatus includes a communication interface, a display, a memory configured to store one or more instructions, and a processor configured to execute the one or more instructions stored in the memory, wherein, when executed, the one or more instructions cause the processor to receive, based on a fingerprint extracted from content displayed on the display, information of a first broadcast channel corresponding to the content from a server and recognize the first broadcast channel corresponding to the content, in response to determining that a broadcast schedule of a replacement target existing advertisement is included in a broadcast schedule of the first broadcast channel, download a replacement advertisement from the server based on a start point of the replacement target existing advertisement, and reproduce the replacement advertisement at an advertisement time of the replacement target existing advertisement of the first broadcast channel.

The one or more instructions may further cause the processor to extract the fingerprint of the content, and transmit information of the fingerprint of the content to the server and receive information of the first broadcast channel corresponding to the content from the server, wherein the first broadcast channel is determined based on a comparison result between the fingerprint of the content and a fingerprint of an image of each of broadcast channels.

The one or more instructions may further cause the processor to extract the fingerprint of the content at predetermined time intervals and determine, based on the fingerprint extracted at the predetermined time intervals, whether the first broadcast channel is continuously output on the display, and request information of a broadcast fingerprint of the first broadcast channel from the server in response to determining that the first broadcast channel is continuously output on the display.

The one or more instructions may further cause the processor to receive a notification indicating the broadcast schedule of the replacement target existing advertisement in the first broadcast channel from the server, wherein the broadcast schedule of the replacement target existing advertisement is determined according to a comparison between an advertisement fingerprint of the first broadcast channel and an advertisement fingerprint of the replacement target existing advertisement.

The one or more instructions may further cause the processor to receive a broadcast fingerprint of the first broadcast channel, in which an advertisement replacement event including information of the start point of the replacement target existing advertisement is set, from the server.

The one or more instructions may further cause the processor to determine a current reproduction position of the first broadcast channel by comparing the broadcast fingerprint of the first broadcast channel and a fingerprint of content displayed in real time on the display, and download at least a portion of the replacement advertisement before the start point of the replacement target existing advertisement based on the determined current reproduction position.

The one or more instructions may further cause the processor to set a second layer on a first layer where a broadcast of the first broadcast channel is output and reproduce the replacement advertisement on the second layer.

The one or more instructions may further cause the processor to, in response to an execution screen for control of the electronic apparatus being called, based on a difference image between an image of the replacement target existing advertisement and an image of the replacement target existing advertisement including the execution screen, display the execution screen overlappingly on an image of the replacement advertisement.

The one or more instructions cause the processor to, in response to the first broadcast channel changing into a second broadcast channel, interrupt the reproduction of the replacement advertisement and display a screen broadcasted on the second broadcast channel on the display.

The one or more instructions may further cause the processor to set a plurality of regions in an image of the content and extract the fingerprint of the content based on a pixel value of the plurality of regions.

According to another aspect of an exemplary embodiment, a method of operating an electronic apparatus includes extracting a fingerprint of content displayed on a display of the electronic apparatus, receiving, based on the extracted fingerprint of the content, information of a first broadcast channel corresponding to the content from a server and recognizing the first broadcast channel corresponding to the content, in response to determining that a broadcast schedule of a replacement target existing advertisement is included in a broadcast schedule of the first broadcast channel, downloading a replacement advertisement from the server based on a start point of the replacement target existing advertisement, and reproducing the replacement advertisement at an advertisement time of the replacement target existing advertisement of the first broadcast channel.

The method may further include extracting the fingerprint of the content at predetermined time intervals and determining, based on the fingerprint extracted at the predetermined time intervals, whether the first broadcast channel is continuously output on the display, and requesting information of a broadcast fingerprint of the first broadcast channel from the server in response to determining that the first broadcast channel is continuously output on the display.

The method may further include receiving a notification indicating the broadcast schedule of the replacement target existing advertisement in the first broadcast channel from the server, wherein the broadcast schedule of the replacement target existing advertisement is determined according to a comparison between an advertisement fingerprint of the first broadcast channel and an advertisement fingerprint of the replacement target existing advertisement.

The method may further include receiving a broadcast fingerprint of the first broadcast channel, in which an advertisement replacement event including information of the start point of the replacement target existing advertisement is set, from the server, wherein the downloading of the replacement advertisement from the server comprises: determining a current reproduction position of the first broadcast channel by comparing the broadcast fingerprint of the first broadcast channel and a fingerprint of content displayed in real time on the display, and downloading at least a portion of the replacement advertisement before the start point of the replacement target existing advertisement based on the determined current reproduction position.

The reproducing of the replacement advertisement may further include setting a second layer on a first layer where a broadcast of the first broadcast channel is output, and reproducing the replacement advertisement on the second layer.

The method may further include, in response to an execution screen for control of the electronic apparatus being called, based on a difference image between an image of the replacement target existing advertisement and an image of the replacement target existing advertisement including the execution screen, displaying the execution screen overlappingly on an image of the replacement advertisement.

The method may further include, in response to the first broadcast channel changing into a second broadcast channel, interrupting the reproducing of the replacement advertisement and displaying a screen broadcasted on the second broadcast channel on the display.

According to another aspect of an exemplary embodiment, a server includes a communication interface, a storage storing one or more instructions, and a processor configured to execute the one or more instructions stored in the storage, wherein when executed, the one or more instructions cause the processor to receive broadcast information about each of broadcast channels from a broadcast station and extract a broadcast fingerprint of an image of each of the broadcast channels, receive a fingerprint of content displayed on an electronic apparatus from the electronic apparatus, determine a first broadcast channel corresponding to the content by comparing the fingerprint of the content and the broadcast fingerprint of the image of each of the broadcast channels, determine, based on a broadcast schedule of the first broadcast channel, whether a replacement target existing advertisement is scheduled to be broadcasted in the electronic apparatus, and transmit a replacement advertisement to the electronic apparatus based on a start point of the replacement target existing advertisement when the replacement target existing advertisement is scheduled to be broadcasted in the electronic apparatus.

The one or more instructions may further cause the processor to: determine whether an advertisement fingerprint of the replacement target existing advertisement in the electronic apparatus is included in an advertisement fingerprint of the first broadcast channel, add and store start point information of the replacement target existing advertisement in a broadcast fingerprint of the first broadcast channel in response to determining that the advertisement fingerprint of the replacement target existing advertisement is included in the advertisement fingerprint of the first broadcast channel, and transmit the broadcast fingerprint of the first broadcast channel to the electronic apparatus.

According to another aspect of an exemplary embodiment, a method of operating a server includes receiving broadcast information about each of broadcast channels from a broadcast station and extracting a broadcast fingerprint of an image of each of the broadcast channels, receiving a fingerprint of content displayed on an electronic apparatus of a user from the electronic apparatus, determining a first broadcast channel corresponding to the content by comparing the fingerprint of the content and the broadcast fingerprint of the image of each of the broadcast channels, determining, based on a broadcast schedule of the first broadcast channel, whether a replacement target existing advertisement is scheduled to be broadcasted in the electronic apparatus, and transmitting a replacement advertisement to the electronic apparatus based on a start point of the replacement target existing advertisement when the replacement target existing advertisement is scheduled to be broadcasted in the electronic apparatus.

BRIEF DESCRIPTION OF THE DRAWINGS

These and/or other aspects will become apparent and more readily appreciated from the following description of the exemplary embodiments, taken in conjunction with the accompanying drawings in which:

FIG. 12 is a diagram illustrating an operation of an electronic apparatus when a broadcast channel changes in the electronic apparatus, according to an exemplary embodiment;

FIGS. 16 and 17 are block diagrams of an electronic apparatus according to an exemplary embodiment;

FIG. 20 is a diagram illustrating a method of replacing an advertisement of a broadcast program in an electronic apparatus, according to another exemplary embodiment.

DETAILED DESCRIPTION

Figure 1:
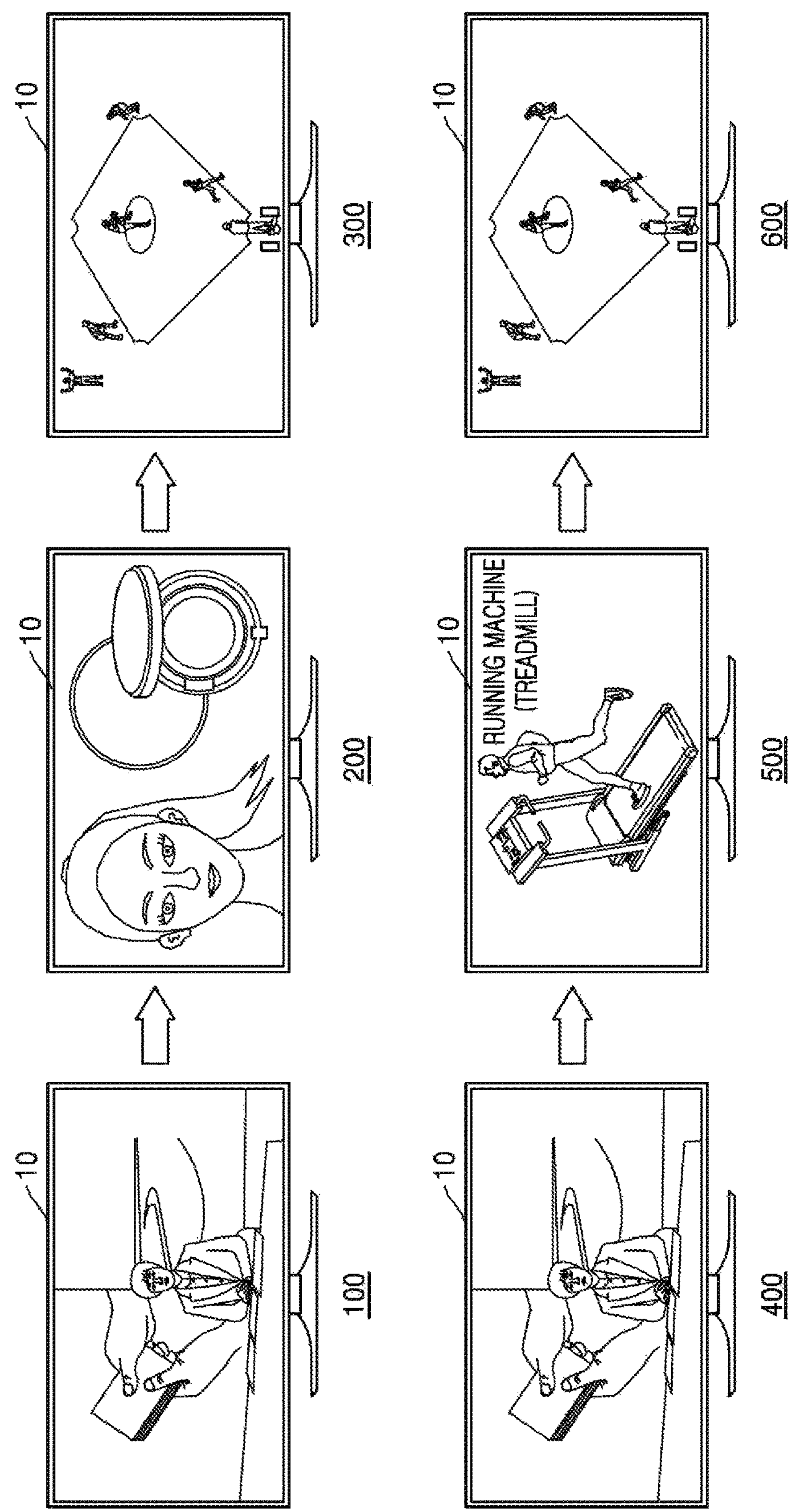
FIG. 1 is a diagram illustrating an example in which an advertisement of a broadcast program is replaced with another advertisement in an electronic apparatus in consideration of information of a user of the electronic apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the specification are those general terms currently widely used in the art in consideration of functions in regard to the exemplary embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description. Thus, the terms used herein should be understood not as simple names but based on the meaning of the terms and the overall description.

Throughout the specification, when something is referred to as "including" a component, another component may be further included unless specified otherwise. Also, the term "unit" used herein means a software component or a hardware component such as a field-programmable gate array (FPGA) or an application-specific integrated circuit (ASIC), and the "unit" performs some functions. However, the term "unit" is not limited to software or hardware. The "unit" may be formed so as to be in an addressable storage medium, or may be formed so as to operate one or more processors. Thus, for example, the "unit" may include components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Although terms such as "first" and "second" may be used herein to describe various elements or components, these elements or components should not be limited by these terms. These terms are only used to distinguish one element or component from another element or component. For example, a first element or component may also be referred to as a second element or component, and vice versa. As used herein, the term "and/or" includes any and all combinations of one or more of the associated listed items.

FIG. 1 is a diagram illustrating an example in which an advertisement of a broadcast program is replaced with another advertisement in an electronic apparatus in consideration of information of a user of the electronic apparatus, according to an exemplary embodiment.

An electronic apparatus 10 may provide a suitable advertisement to a user of the electronic apparatus 10 based on profile information of the electronic apparatus 10. Herein, the profile information of the electronic apparatus 10 may include, but is not limited to, the sex, age, talent, hobby, and favorite channel of the user of the electronic apparatus 10.

The electronic apparatus 10 may be, but is not limited to, a smart phone, a tablet personal computer (PC), a PC, a television (TV) a smart TV, a mobile phone, a personal digital assistant (PDA), a laptop computer, a media player, a micro server, a global positioning system (GPS) apparatus, an e-book terminal (reader), a digital broadcast terminal, a navigation apparatus, a kiosk, an MP3 player, a digital camera, or other mobile or non-mobile apparatuses.

The user of the electronic apparatus 10 may view a news broadcast 100, a cosmetic advertisement broadcast 200, and a sports news broadcast 300 according to a broadcast schedule of a first broadcast channel. However, based on the profile information of the electronic apparatus 10, the electronic apparatus 10 may replace the cosmetic advertisement broadcast 200 with a health product advertisement broadcast 500 targeted at the user. Thus, the user of the electronic apparatus 10 may view a news broadcast 400, a health product advertisement broadcast 500, and a sports news broadcast 600 unlike the broadcast schedule of the first broadcast channel.

The electronic apparatus 10 may provide a suitable advertisement to the user based on a broadcast channel being viewed in the electronic apparatus 10, a replacement target existing advertisement, a start point of the replacement target existing advertisement, a previous advertisement time of the replacement target existing advertisement, and information about a replacement advertisement.

Figure 2:
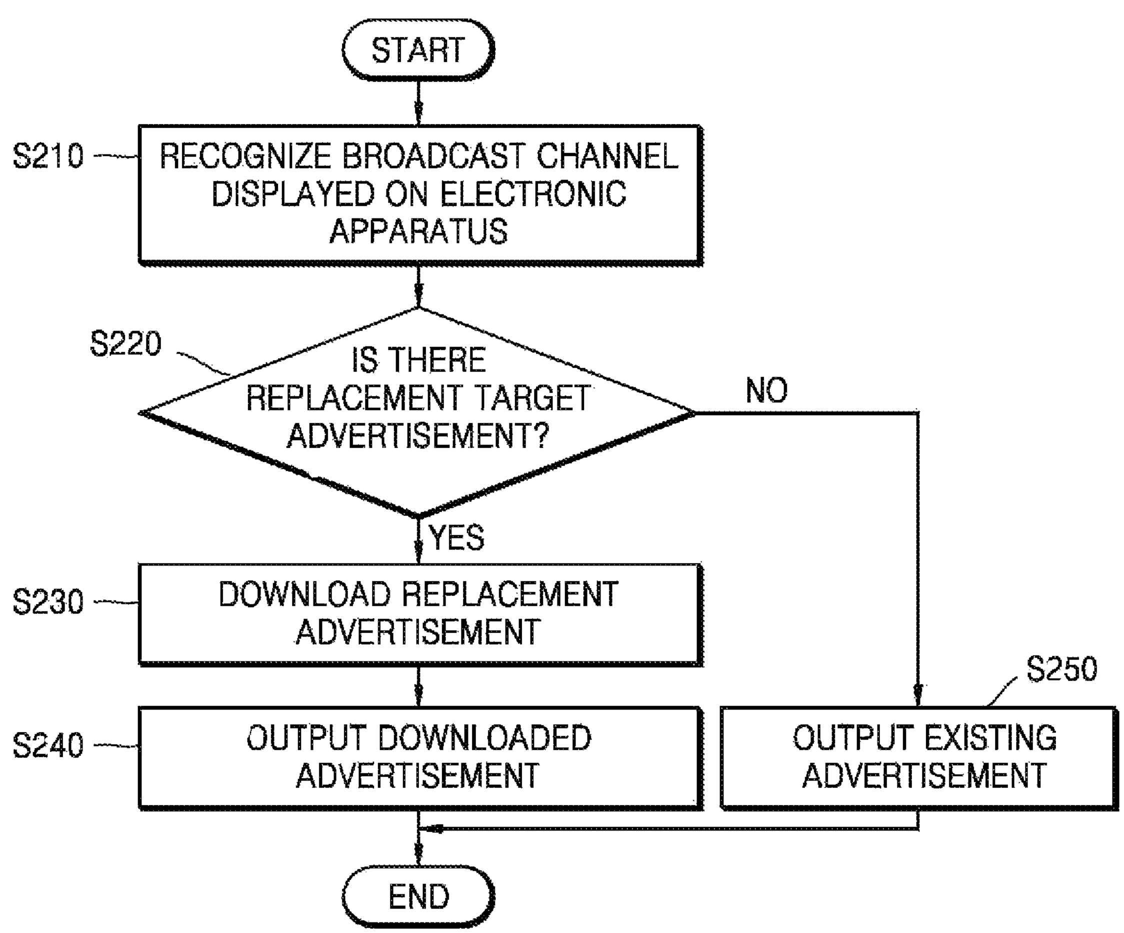
FIG. 2 is a flow diagram of a method in which an advertisement of a broadcast program is replaced in an electronic apparatus, according to an exemplary embodiment.

FIG. 2 is a flow diagram of a method in which an advertisement of a broadcast program is replaced in an electronic apparatus, according to an exemplary embodiment.

In operation S210, based on a fingerprint of content displayed on a display of the electronic apparatus 10, the electronic apparatus 10 may recognize a first broadcast channel corresponding to the content. Specifically, based on a fingerprint extracted from the content displayed on the display of the electronic apparatus 10, the electronic apparatus 10 may receive information of the first broadcast channel corresponding to the content from a server and recognize the first broadcast channel corresponding to the content. Herein, the "fingerprint" may refer to a unique identifier extracted from an image or a video frame. The "fingerprint technology" is a technology for recognizing an image or a video frame by comparing a unique identifier extracted from the image or the video frame instead of comparing the image or the video frame itself. A method of extracting a fingerprint of content will be described below with reference to FIGS. 13 to 15.

In operation S220, when the first broadcast channel is recognized by the electronic apparatus 10, the electronic apparatus 10 may determine whether there is a replacement target existing advertisement among the existing advertisements broadcasted on the first broadcast channel. That is, the electronic apparatus 10 may determine whether there is a broadcast schedule of the replacement target existing advertisement is included in a schedule of the first broadcast channel.

In operation S230, when a broadcast of the replacement target existing advertisement is scheduled in a broadcast schedule of the first broadcast channel, the electronic apparatus 10 may download a replacement advertisement from a server 20 based on a start point of the replacement target existing advertisement. The electronic apparatus 10 may download all or part of the replacement advertisement before the start point of the replacement target existing advertisement.

In operation S240, the electronic apparatus 10 may reproduce the replacement advertisement at an advertisement time of the replacement target existing advertisement on the first broadcast channel. Herein, the electronic apparatus 10 may reproduce the replacement advertisement overlappingly on a screen where the replacement target existing advertisement is output. Specifically, the electronic apparatus 10 may set a second layer on a first layer where a broadcast of the first broadcast channel is output and reproduce the replacement advertisement on the second layer.

In operation S250, when the broadcast of the replacement target existing advertisement is not scheduled in the broadcast schedule of the first broadcast channel, the electronic apparatus 10 may output the existing advertisement broadcasted according to the broadcast schedule of the first broadcast channel.

Figure 3:
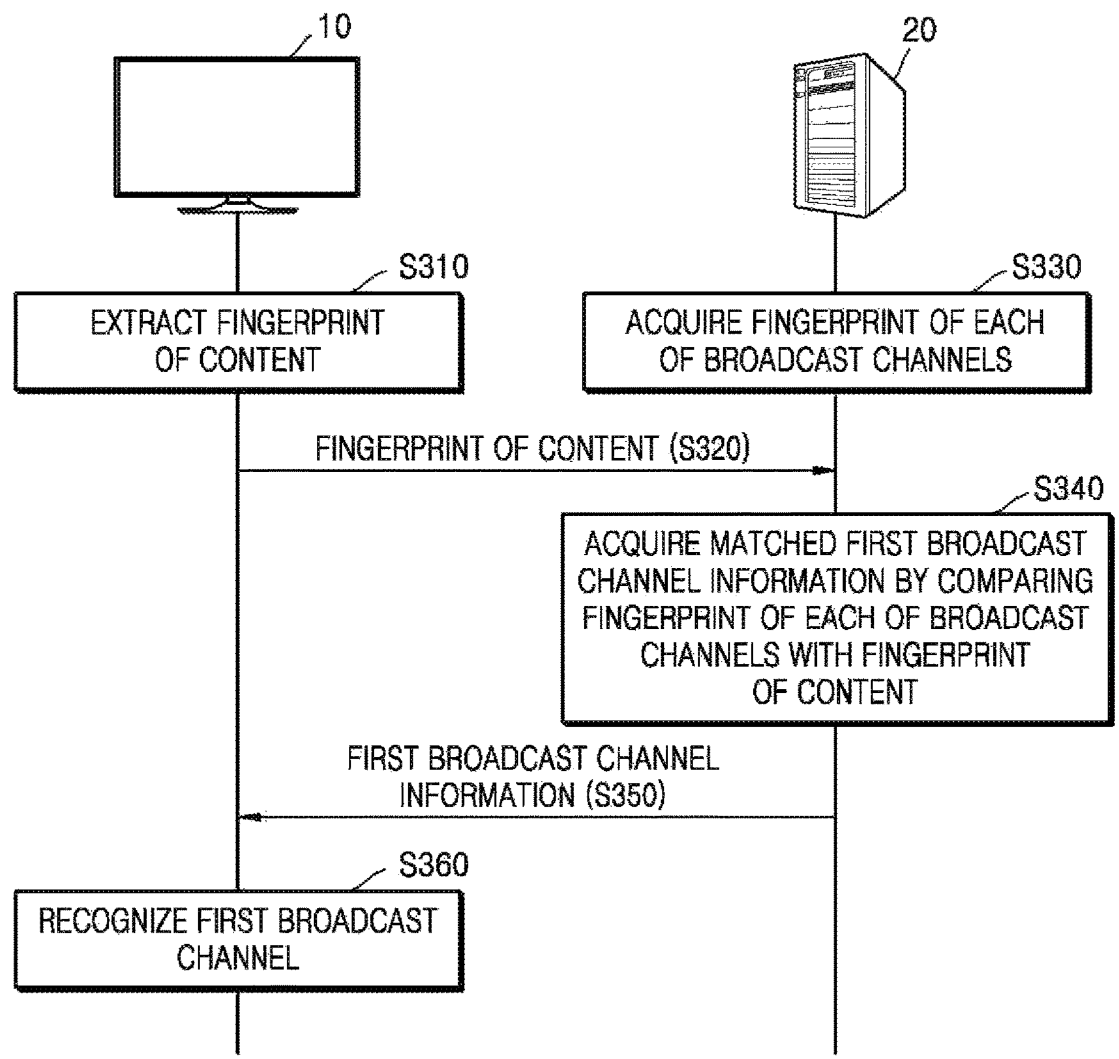
FIG. 3 is a flow diagram of a method of recognizing a broadcast channel corresponding to content displayed on an electronic apparatus, according to an exemplary embodiment.

FIG. 3 is a flow diagram of a method of recognizing a broadcast channel corresponding to content displayed on the electronic apparatus 10, according to an exemplary embodiment.

In operation S310, the electronic apparatus 10 may extract a fingerprint of the content. For example, the electronic apparatus 10 may divide an image of the content into a plurality of regions and extract a fingerprint of the content based on a color value or a pixel value of each of the plurality of regions.

In operation S320, the electronic apparatus 10 may transmit the extracted fingerprint of the content to the server 20.

In operation S330, the server 20 may acquire a fingerprint of an image of each of the broadcast channels. Hereinafter, the fingerprint of the image of each of the broadcast channels may be understood as a fingerprint of each of the images broadcasted on the broadcast channels. Also, the fingerprint of the image broadcasted on the first broadcast channel may be understood as a fingerprint of the first broadcast channel. The server 20 may receive a broadcast signal, which is identical to a broadcast signal received in the electronic apparatus 10, from a broadcast station a few seconds earlier than the electronic apparatus 10. The server 20 may receive broadcast information about the broadcast channels broadcasted respectively by a plurality of broadcast stations from the plurality of broadcast stations. The server 20 may extract and store a fingerprint of an image of each of the broadcast channels. Also, the server 20 may interlock the fingerprint of the image of each of the broadcast channels with the broadcast program information and store the interlocking result. Herein, the fingerprint of the broadcast channel may include a fingerprint of a broadcast program included in the schedule of the broadcast channel and a fingerprint of an advertisement included in the schedule of the broadcast channel.

In operation S340, by comparing the fingerprint of an image of each of the broadcast channels and the fingerprint of the content received from the electronic apparatus 10, the server 20 may detect a fingerprint of the first broadcast channel that matches the fingerprint of the content. The server 20 may determine the first broadcast channel of the matched fingerprint as a broadcast channel of the content and acquire information of the first broadcast channel.

In operation S350, the server 20 may transmit the information of the first broadcast channel corresponding to the content to the electronic apparatus 10.

In operation S360, the electronic apparatus 10 may receive the information of the first broadcast channel from the server 20 and recognize the broadcast channel of the content broadcasted in the electronic apparatus 10 as the first broadcast channel.

Figure 4:
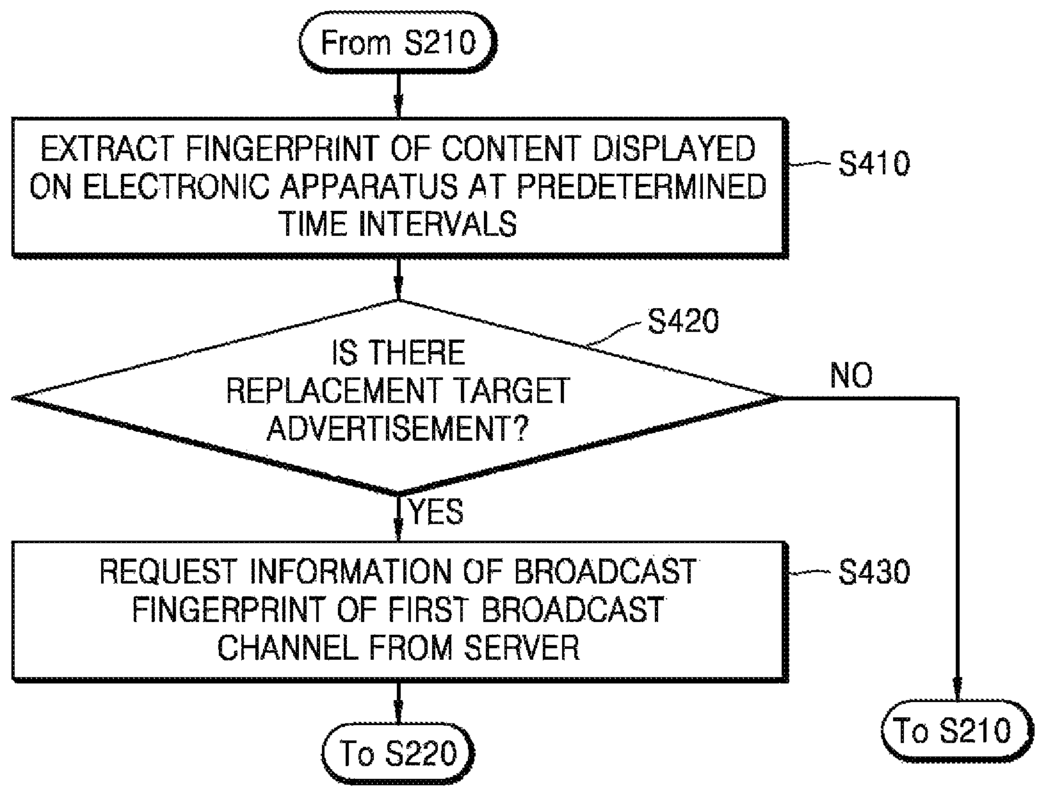
FIG. 4 is a flow diagram of a method of determining whether a recognized broadcast channel is locked in an electronic apparatus, according to an exemplary embodiment.

FIG. 4 is a flow diagram of a method of determining whether a recognized broadcast channel is locked in the electronic apparatus 10, according to an exemplary embodiment.

In operation S410, when the broadcast channel corresponding to the content output by the electronic apparatus 10 is recognized as the first broadcast channel, in order to determine whether the first broadcast channel is continuously output by the electronic apparatus 10, the electronic apparatus 10 may extract a fingerprint of the content output by the electronic apparatus 10 at predetermined time intervals. For example, the electronic apparatus 10 may extract a fingerprint of the content output on a display of the electronic apparatus 10 at intervals of 2 seconds.

In operation S420, the electronic apparatus 10 may determine whether the first broadcast channel is continuously output by the electronic apparatus 10. According to whether the information of the broadcast channel acquired from the fingerprint of the content extracted at predetermined time intervals is identical to the information of the first broadcast channel, the electronic apparatus 10 may determine whether the first broadcast channel is continuously output by the electronic apparatus 10.

For example, when the information of the broadcast channel acquired from the fingerprint of the content extracted at intervals of 2 seconds is identical to the information of the first broadcast channel three or more times, the electronic apparatus 10 may determine that the broadcast channel output by the electronic apparatus 10 is locked at the first broadcast channel.

On the other hand, when it is determined that the first broadcast channel is not continuously output by the electronic apparatus 10, the electronic apparatus 10 may recognize the broadcast channel corresponding to the content and repeat a process of determining whether the recognized broadcast channel is locked.

In operation S430, when it is determined that the first broadcast channel is continuously output by the electronic apparatus 10, the electronic apparatus 10 may request information of a broadcast fingerprint of the first broadcast channel from the server 20.

Figure 5:
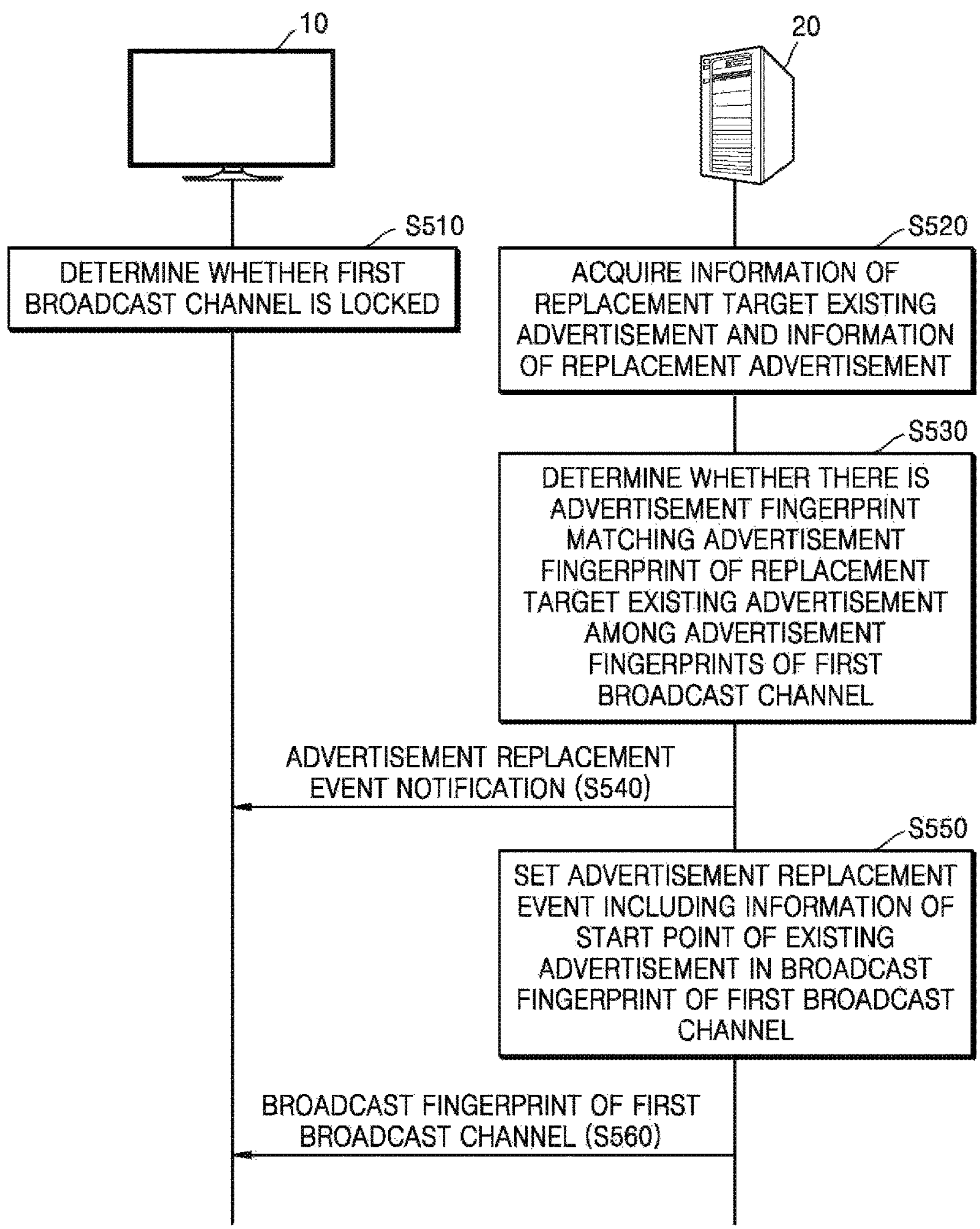
FIG. 5 is a flow diagram of a method of receiving an advertisement replacement event notification in an electronic apparatus, according to an exemplary embodiment.

FIG. 5 is a flow diagram of a method of receiving an advertisement replacement event notification in the electronic apparatus 10, according to an exemplary embodiment.

In operation S510, the electronic apparatus 10 may determine whether the first broadcast channel corresponding to the content output by the electronic apparatus 10 is locked. Because a process of determining whether the first broadcast channel is locked is the same as that illustrated in FIG. 4, redundant descriptions thereof will be omitted for conciseness.

In operation S520, the server 20 may acquire information of the replacement target existing advertisement and information of the replacement advertisement. For example, the server 20 may acquire advertisement fingerprint information of the replacement target existing advertisement and advertisement fingerprint information of the replacement advertisement.

The server 20 may receive the information of the replacement target existing advertisement and the information of the replacement advertisement from an external apparatus. Also, the server 20 may determine a replacement target existing advertisement and a replacement advertisement and acquire information of each advertisement. Specifically, the server 20 may receive profile information of the electronic apparatus 10 from the electronic apparatus 10 and determine the replacement target existing advertisement and the replacement advertisement based on the profile information of the electronic apparatus 10. Herein, the profile information of the electronic apparatus 10 may include, but is not limited to, the sex, age, talent, hobby, and favorite channel of the user of the electronic apparatus 10.

For example, when a favorite channel of the user of the electronic apparatus 10 is a golf channel, the server 20 may determine to replace a cosmetic advertisement, which is to be broadcasted on the first broadcast channel, with a golf product advertisement and acquire information of the cosmetic advertisement (i.e., the replacement target advertisement) and information of the golf product advertisement (i.e., the replacement advertisement).

In operation S530, the server 20 may determine whether there is an advertisement fingerprint identical to an advertisement fingerprint of the replacement target existing advertisement among the advertisement fingerprints of the first broadcast channel.

In operation S540, when there is an advertisement fingerprint identical to an advertisement fingerprint of the replacement target existing advertisement among the advertisement fingerprints of the first broadcast channel, the server 20 may transmit a notification indicating the existence of an advertisement replacement event to the electronic apparatus 10.

On the other hand, when there is not an advertisement fingerprint identical to an advertisement fingerprint of the replacement target existing advertisement among the advertisement fingerprints of the first broadcast channel, the server 20 may transmit a notification indicating the non-existence of an advertisement replacement event to the electronic apparatus 10.

In operation S550, the server 20 may set an advertisement replacement event including a start point of the replacement target existing advertisement in a broadcast fingerprint of the first broadcast channel.

In operation S560, the electronic apparatus 10 may receive the broadcast fingerprint of the first broadcast channel, in which an advertisement replacement event is set, from the server 20.

Figure 6:
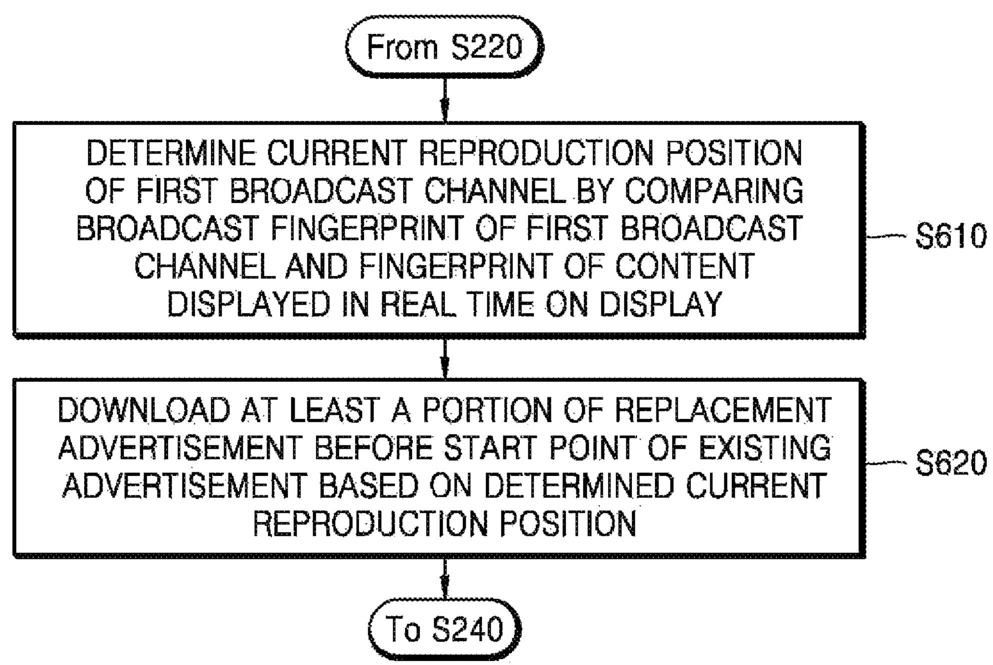
FIG. 6 is a flow diagram of a method of downloading a replacement advertisement by determining in real time a reproduction position of content displayed on an electronic apparatus, according to an exemplary embodiment.

FIG. 6 is a flow diagram of a method of downloading a replacement advertisement by determining in real time a reproduction position of content displayed on the electronic apparatus 10, according to an exemplary embodiment.

In operation S610, the electronic apparatus 10 may determine a current reproduction position of the first broadcast channel by comparing the broadcast fingerprint of the first broadcast channel and the broadcast fingerprint of the content displayed on the display of the electronic apparatus 10.

By accurately determining the current reproduction position of the first broadcast channel, the electronic apparatus 10 may acquire an advertisement replacement event suitable for the current point.

In operation S620, the electronic apparatus 10 may download all or part of the replacement advertisement before the start point of the replacement target existing advertisement based on the determined current reproduction position.

The electronic apparatus 10 may download all or part of the replacement advertisement in consideration of the state of the electronic apparatus 10. Herein, the state of the electronic apparatus 10 may include, but is not limited to, the capacity of a storage space of the electronic apparatus 10 and the communication state between the electronic apparatus 10 and the server 20.

For example, when the storage capacity in the electronic apparatus 10 is not sufficient, the electronic apparatus 10 may download a portion of the replacement advertisement before the start of the replacement advertisement and download and reproduce the remaining portion in a streaming manner during the reproduction of the replacement advertisement.

Figure 7:
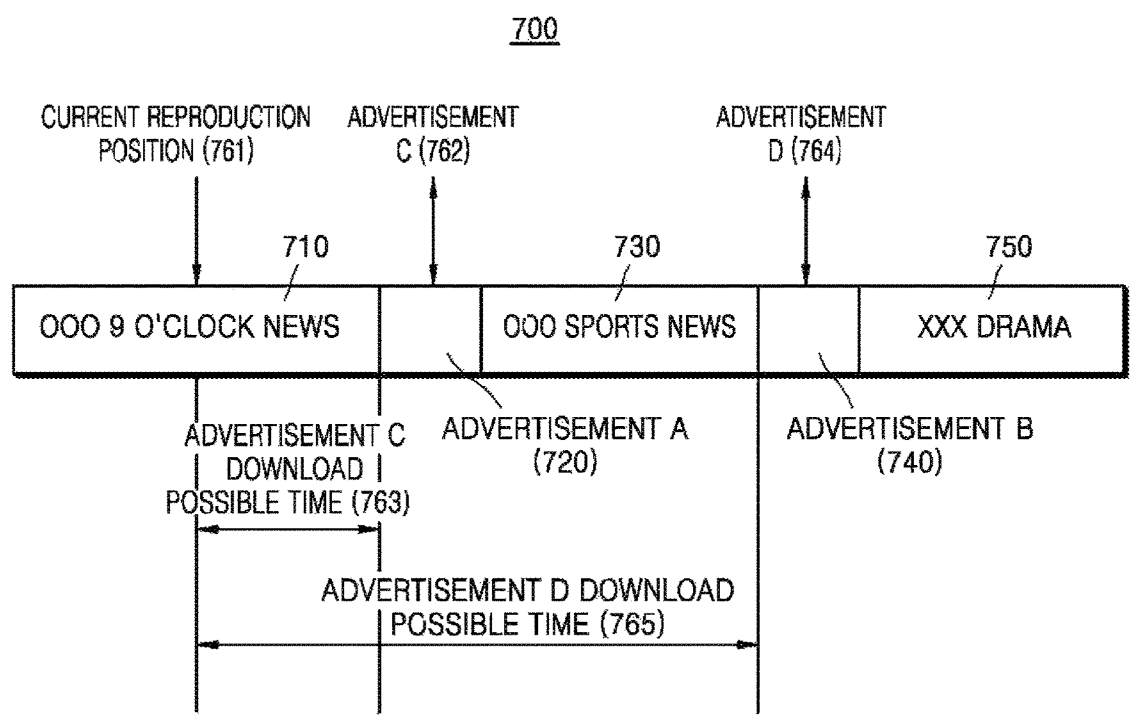
FIG. 7 is a diagram illustrating the time of downloading a replacement advertisement in an electronic apparatus, according to an exemplary embodiment.

FIG. 7 is a diagram illustrating the time of downloading a replacement advertisement in the electronic apparatus 10, according to an exemplary embodiment.

The electronic apparatus 10 may acquire information including a broadcast schedule 700 of the first broadcast channel. As illustrated in FIG. 7, the broadcast schedule 700 of the first broadcast channel may include a broadcast schedule timetable of a OOO 9 o'clock news 710, an advertisement A 720, a OOO sports news 730, an advertisement B 740, and a XXX drama 750.

The electronic apparatus 10 may determine a current reproduction position 761 of the first broadcast channel by comparing the broadcast fingerprint of the first broadcast channel and the fingerprint of the content displayed on the electronic apparatus 10.

The electronic apparatus 10 may receive an advertisement replacement event notification indicating that the advertisement A 720 is replaced with an advertisement C 762 and the advertisement B 740 is replaced with an advertisement D 764, from the server 20. The advertisement replacement event in which the advertisement A 720 is replaced with the advertisement C 762 and the advertisement B 740 is replaced with the advertisement D 764 may be determined based on the profile information of the electronic apparatus 10.

As illustrated in FIG. 7, a download time 763 of the advertisement C 762 may be from the point corresponding to the current reproduction position 761 to the start point of the replacement target advertisement A 720.

Also, a download time 765 of the advertisement D 764 may be from the point corresponding to the current reproduction position 761 to the start point of the replacement target advertisement B 740.

The electronic apparatus 10 may download the advertisement D 764 from the point corresponding to the current reproduction position 761; however, during the broadcasting of the advertisement C 762 or the OOO sports news 730, the electronic apparatus 10 may be turned off or the broadcast channel displayed on the display of the electronic apparatus 10 may change. In this case, the electronic apparatus 10 may download the replacement advertisement D 764 T seconds before the start point of the advertisement B 740. Herein, T seconds may be determined in consideration of the capacity of the replacement advertisement D 764 or the time taken for the electronic apparatus 10 to download the replacement advertisement D 764.

Figure 8:
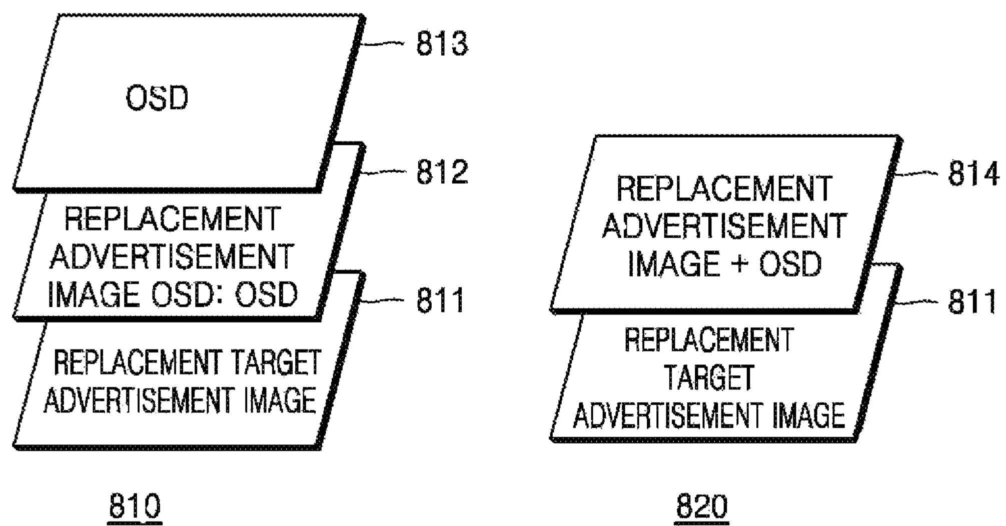
FIG. 8 is a diagram illustrating a layer for reproducing a replacement advertisement in an electronic apparatus, according to an exemplary embodiment.

FIG. 8 is a diagram illustrating a layer for reproducing a replacement advertisement in the electronic apparatus 10, according to an exemplary embodiment.

The electronic apparatus 10 may receive a broadcast signal of the first broadcast channel from a broadcast station or a set-top box and output a broadcast of the first broadcast channel. The electronic apparatus 10 may display an execution screen for control of the electronic apparatus 10, such as broadcast channel change, volume control, displaying of a broadcast schedule timetable of a broadcast channel, or setting of the environment of the electronic apparatus 10, overlappingly on a screen where a broadcast of the first broadcast channel is output. That is, the electronic apparatus 10 may set an execution screen for control of the electronic apparatus 10 as an on-screen display (OSD).

For example, layers constituting the screen displayed on the display of the electronic apparatus 10 may be configured as illustrated in 810 of FIG. 8. Specifically, the layers may include a first layer 811 for outputting a broadcast of the first broadcast channel, a second layer 812 for reproducing an image of the replacement advertisement, and a third layer 813 for displaying an execution screen for control of the electronic apparatus 10. When the replacement target existing advertisement is output on the first layer 811, the electronic apparatus 10 may reproduce the replacement advertisement on the second layer 812. Also, when a command for control of the electronic apparatus 10 is received during the reproduction of the replacement advertisement on the second layer 812, the electronic apparatus 10 may display an execution screen for control of the electronic apparatus 10 on the third layer 813. Because the execution screen for control of the electronic apparatus 10 is displayed on the upper layer, the user may efficiently control the electronic apparatus 10 even while the replacement advertisement is reproduced.

As another example, layers constituting the screen displayed on the display of the electronic apparatus 10 may be configured as illustrated in 820 of FIG. 8. Specifically, the layers may include a first layer 811 for outputting a broadcast of the first broadcast channel and a second layer 814 for outputting an image of the replacement advertisement and an execution screen for control of the electronic apparatus 10.

Figure 9:
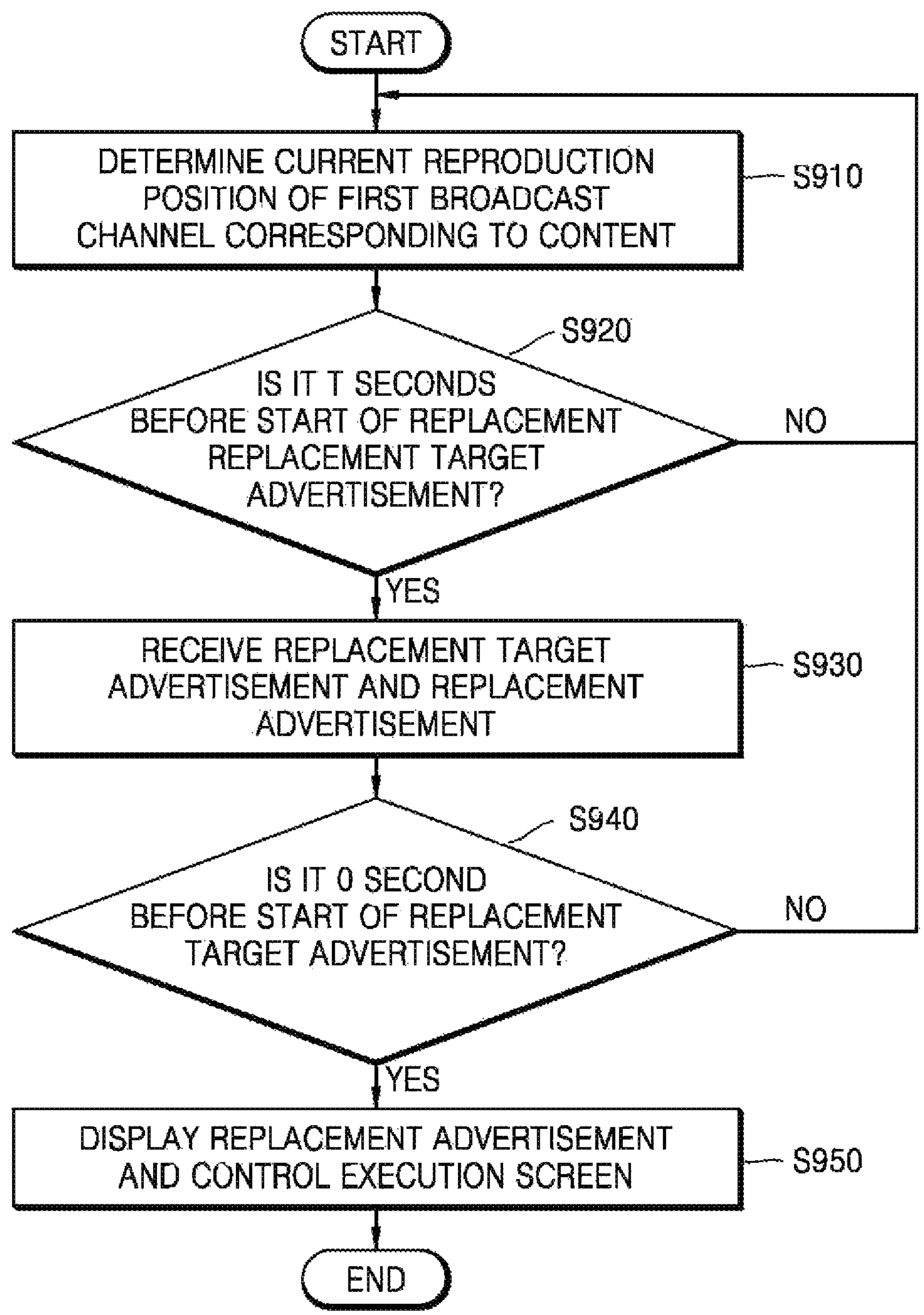
FIG. 9 is a flow diagram of a method of reproducing a replacement advertisement in an electronic apparatus and displaying an execution screen for control of the electronic apparatus, according to an exemplary embodiment.

FIG. 9 is a flow diagram of a method of reproducing a replacement advertisement in the electronic apparatus 10 and displaying an execution screen for control of the electronic apparatus 10, according to an exemplary embodiment.

In operation S910, the electronic apparatus 10 may determine a current reproduction position of the first broadcast channel corresponding to the content displayed on the electronic apparatus 10. The electronic apparatus 10 may determine a current reproduction position of the first broadcast channel by comparing the broadcast fingerprint of the first broadcast channel and the fingerprint of the content displayed on the display of the electronic apparatus 10.

In operation S920, the electronic apparatus 10 may determine whether the start point of the replacement target existing advertisement is T seconds before. Herein, T seconds may be determined in consideration of the capacity of the replacement advertisement or the time taken for the electronic apparatus 10 to download the replacement advertisement and the replacement target advertisement. When the start point of the replacement target existing advertisement is T seconds before, the electronic apparatus 10 may operate according to operation S930. When the start point of the replacement target existing advertisement is (T+1) seconds before, the electronic apparatus 10 may operate according to operation S910.

In operation S930, the electronic apparatus 10 may receive the replacement target existing advertisement and the replacement advertisement.

In operation S940, the electronic apparatus 10 may monitor the broadcast schedule of the first broadcast channel to determine whether the start point of the replacement target existing advertisement has arrived. When it is before the start point of the replacement target existing advertisement, the electronic apparatus 10 may operate according to operation S910. When it is the start point of the replacement target existing advertisement, the electronic apparatus 10 may operate according to operation S950.

In operation S950, the electronic apparatus 10 may reproduce the replacement advertisement on a second layer that is separately set on a first layer where the replacement target existing advertisement is reproduced. The actual screen displayed on the display of the electronic apparatus 10 may be the replacement advertisement that is reproduced on the second layer. In this case, the electronic apparatus 10 may receive a command for control of the electronic apparatus 10 from the user. The electronic apparatus 10 may display an execution screen for control of the electronic apparatus 10 overlappingly on the second layer where the replacement advertisement is reproduced.

Figure 10:
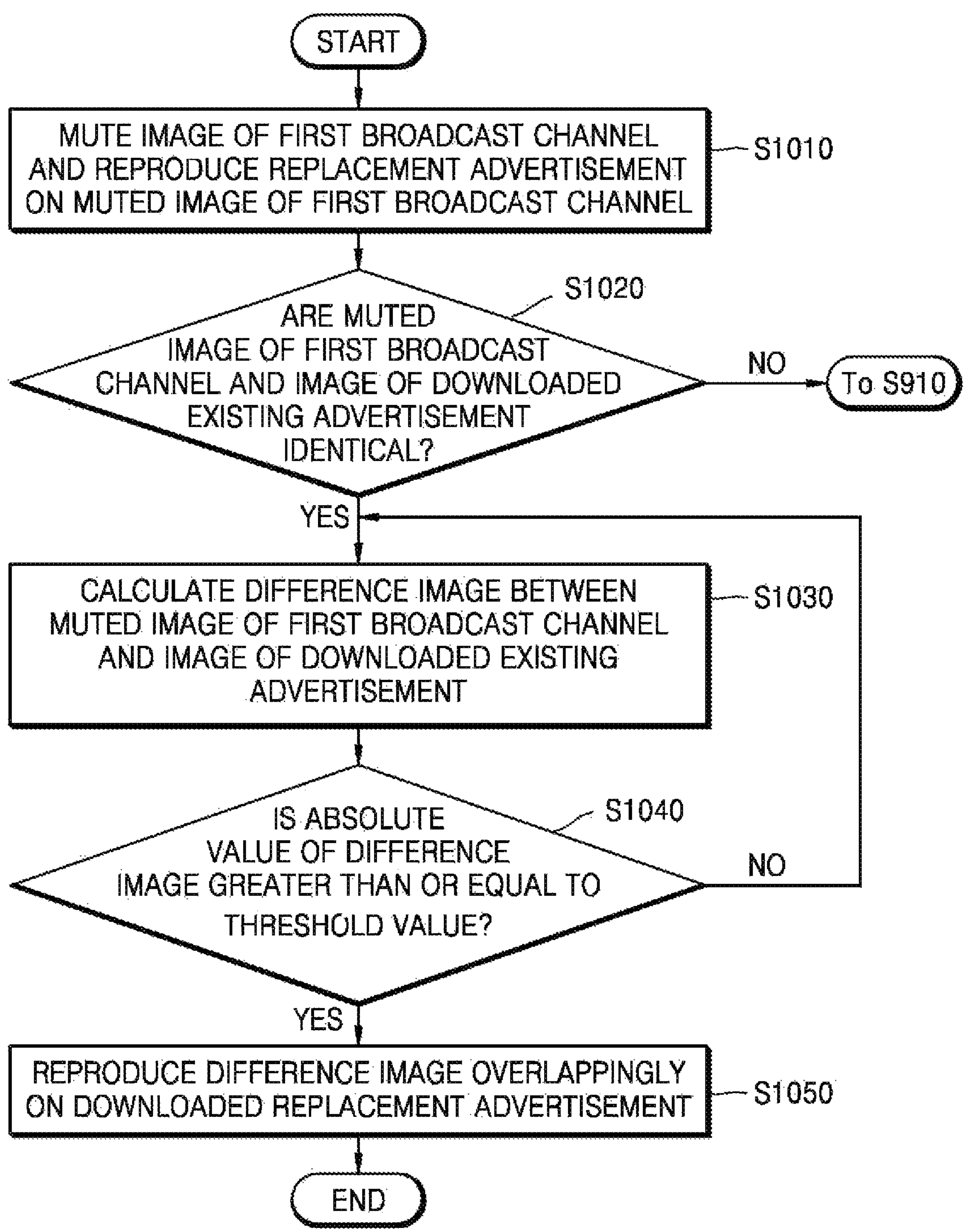
FIG. 10 is a flow diagram of a method of displaying an execution screen for control of an electronic apparatus on a replacement advertisement in the electronic apparatus, according to an exemplary embodiment.

FIG. 10 is a flow diagram of a method of displaying an execution screen for control of the electronic apparatus 10 on a replacement advertisement in the electronic apparatus 10, according to an exemplary embodiment.

In operation S1010, when the broadcast of the replacement target existing advertisement starts in the first broadcast channel, the electronic apparatus 10 may mute an image of the first broadcast channel and display the replacement advertisement overlappingly on an image of the replacement target existing advertisement of the first broadcast channel. Specifically, the electronic apparatus 10 may perform a control operation to mute a broadcast of the first broadcast channel and reproduce the replacement advertisement on the second layer that is separately set on the first layer where the broadcast of the first broadcast channel is output. The user of the electronic apparatus 10 may view the replacement advertisement.

In operation S1020, the electronic apparatus 10 may determine whether the muted image of the first broadcast channel and the downloaded image of the existing advertisement are identical. By comparing the broadcast fingerprint of the first broadcast channel and the advertisement fingerprint of the existing advertisement, the electronic apparatus 10 may determine whether an image of the first broadcast channel and the downloaded image of the existing advertisement are identical. When the image of the first broadcast channel and the downloaded image of the existing advertisement are not identical, the electronic apparatus 10 may operate according to operation S910.

In operation S1030, the electronic apparatus 10 may acquire a difference image by using the downloaded image of the existing advertisement and the image of the first broadcast channel including the execution screen for control of the electronic apparatus 10.

Specifically, at the advertisement time of the replacement target existing advertisement, the image of the first broadcast channel may be an image of the replacement target existing advertisement. When an execution screen for control of the electronic apparatus 10 is called from the user, the electronic apparatus 10 may display an image of the replacement target existing advertisement and the execution screen for control of the electronic apparatus 10 on the first layer. The electronic apparatus 10 may calculate a difference image between images by using the downloaded image of only the existing advertisement and the image of the replacement target existing advertisement including the execution screen for control of the electronic apparatus 10. The calculated difference image may include only the execution screen for control of the electronic apparatus 10.

In operation S1040, the electronic apparatus 10 may determine whether an absolute value of the difference image is greater than or equal to a threshold value and determine whether the execution screen for control of the electronic apparatus 10 is called according to the determination result. For example, when the absolute value of the difference image is greater than or equal to the threshold value, the electronic apparatus 10 may determine that a control command of the electronic apparatus 10 is received from the user and an execution screen for the control command is called. When the absolute value of the difference image is smaller than the threshold value, the electronic apparatus 10 may operate according to operation S1030.

In operation S1050, when the absolute value of the difference image is greater than or equal to the threshold value, the electronic apparatus 10 may display the difference image overlappingly on the downloaded replacement target advertisement. Specifically, the electronic apparatus 10 may set a third layer on the second layer where the replacement advertisement is reproduced and display an execution screen for control of the electronic apparatus 10 on the third layer. Also, the electronic apparatus 10 may display the execution screen for control of the electronic apparatus 10 overlappingly on the second layer where the replacement advertisement is reproduced.

While the replacement advertisement is reproduced in the electronic apparatus 10, even when a control command of the electronic apparatus 10 is received from the user, because the electronic apparatus 10 displays an execution screen for control of the electronic apparatus 10 overlappingly on the replacement advertisement, the user may smoothly control the electronic apparatus 10.

Figure 11:
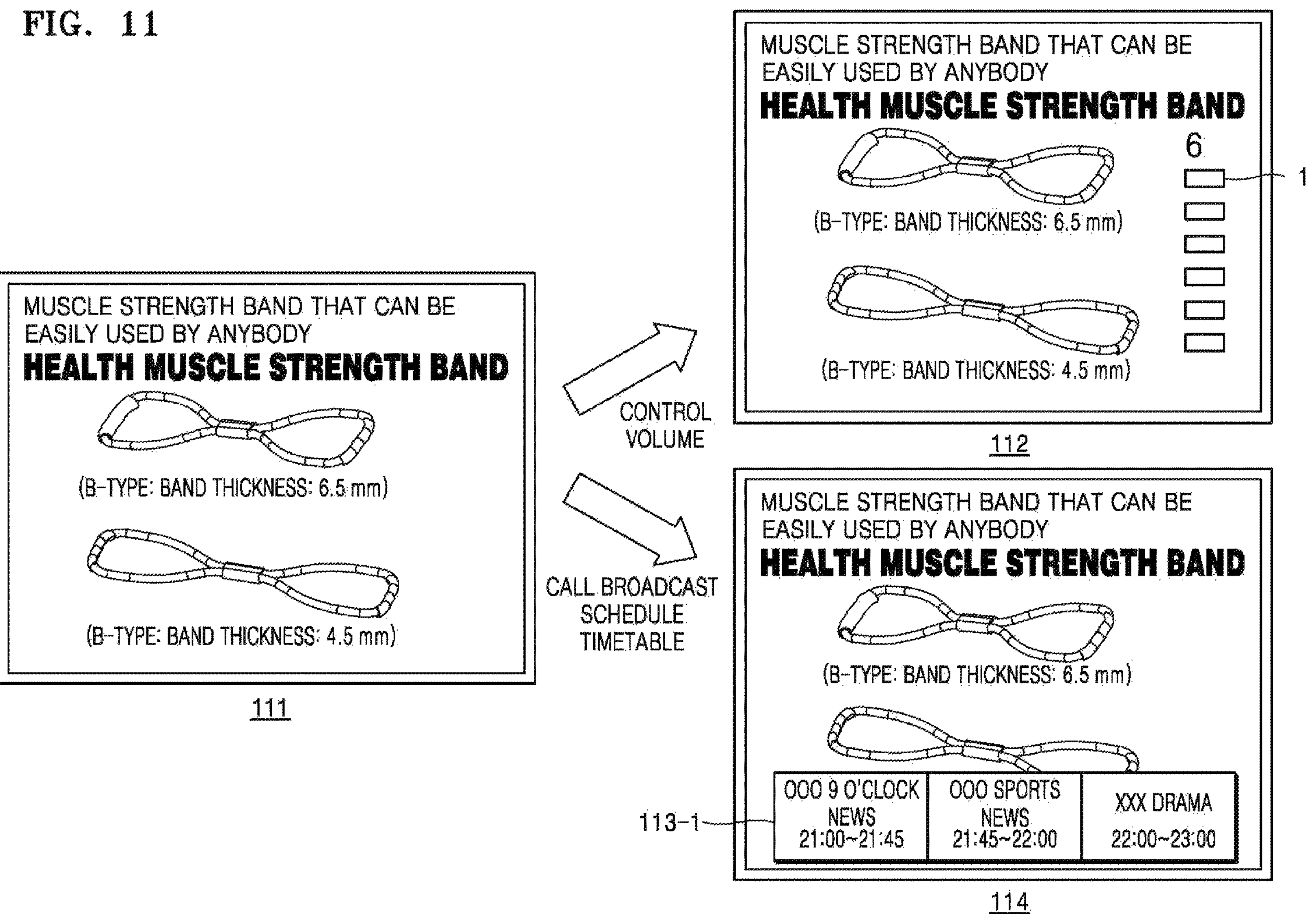
FIG. 11 is a diagram illustrating an example in which an execution screen for control of an electronic apparatus is displayed on a replacement advertisement according to a control command of a user, according to an exemplary embodiment.

FIG. 11 is a diagram illustrating an example in which an execution screen for control of the electronic apparatus 10 is displayed on a replacement advertisement according to a control command of the user, according to an exemplary embodiment.

Referring to 111 of FIG. 11, the electronic apparatus 10 may replace the existing cosmetic advertisement broadcasted on the first broadcast channel with a health product advertisement prior to display. As described above, based on the profile information of the electronic apparatus 10, the electronic apparatus 10 may reproduce an image of the health product advertisement while an image of the cosmetic advertisement is broadcasted on the first broadcast channel. The electronic apparatus 10 may reproduce an image of the health product advertisement overlappingly on an image of the cosmetic advertisement broadcasted on the first broadcast channel. That is, during the advertisement time of the cosmetic advertisement of the first broadcast channel, the user of the electronic apparatus 10 may view an image of the health product advertisement, and the user of another electronic apparatus 10 may view an image of the cosmetic advertisement.

The electronic apparatus 10 may receive a control command of the user while an image of the health product advertisement is reproduced in the electronic apparatus 10. Because an image of the health product advertisement is displayed on a display of the electronic apparatus 10, an execution screen for control of the electronic apparatus 10 may not be directly displayed on the display. Specifically, an image of the cosmetic advertisement broadcasted on the first broadcast channel and an execution screen for control of the electronic apparatus 10 may be displayed on the first layer, and an image of the health product advertisement may be displayed on the second layer. The electronic apparatus 10 may acquire a difference image between an image of only the downloaded cosmetic advertisement and an image of the cosmetic advertisement including an execution screen for control of the electronic apparatus 10, which is displayed on the first layer. The electronic apparatus 10 may display a difference image indicating an execution screen for control of the electronic apparatus 10 overlappingly on an image of the health product advertisement.

112 of FIG. 11 illustrates a screen displayed on the display of the electronic apparatus 10 when the user controls the volume of the electronic apparatus 10. The electronic apparatus 10 may display a screen for control of the volume size overlappingly on an image of the health product advertisement even when the user controls the volume size by using a remote control of the electronic apparatus 10 at the time of the cosmetic advertisement broadcasted on the first broadcast channel in a state where the broadcast channel of the electronic apparatus 10 is locked at the first broadcast channel.

113 of FIG. 11 illustrates a screen displayed on the display of the electronic apparatus 10 when the user calls a broadcast schedule timetable. The electronic apparatus 10 may display a broadcast schedule timetable overlappingly on an image of the health product advertisement even when the user calls the broadcast schedule timetable by using a remote control of the electronic apparatus 10 at the time of the cosmetic advertisement broadcasted on the first broadcast channel in a state where the broadcast channel of the electronic apparatus 10 is locked at the first broadcast channel.

Figure 12:
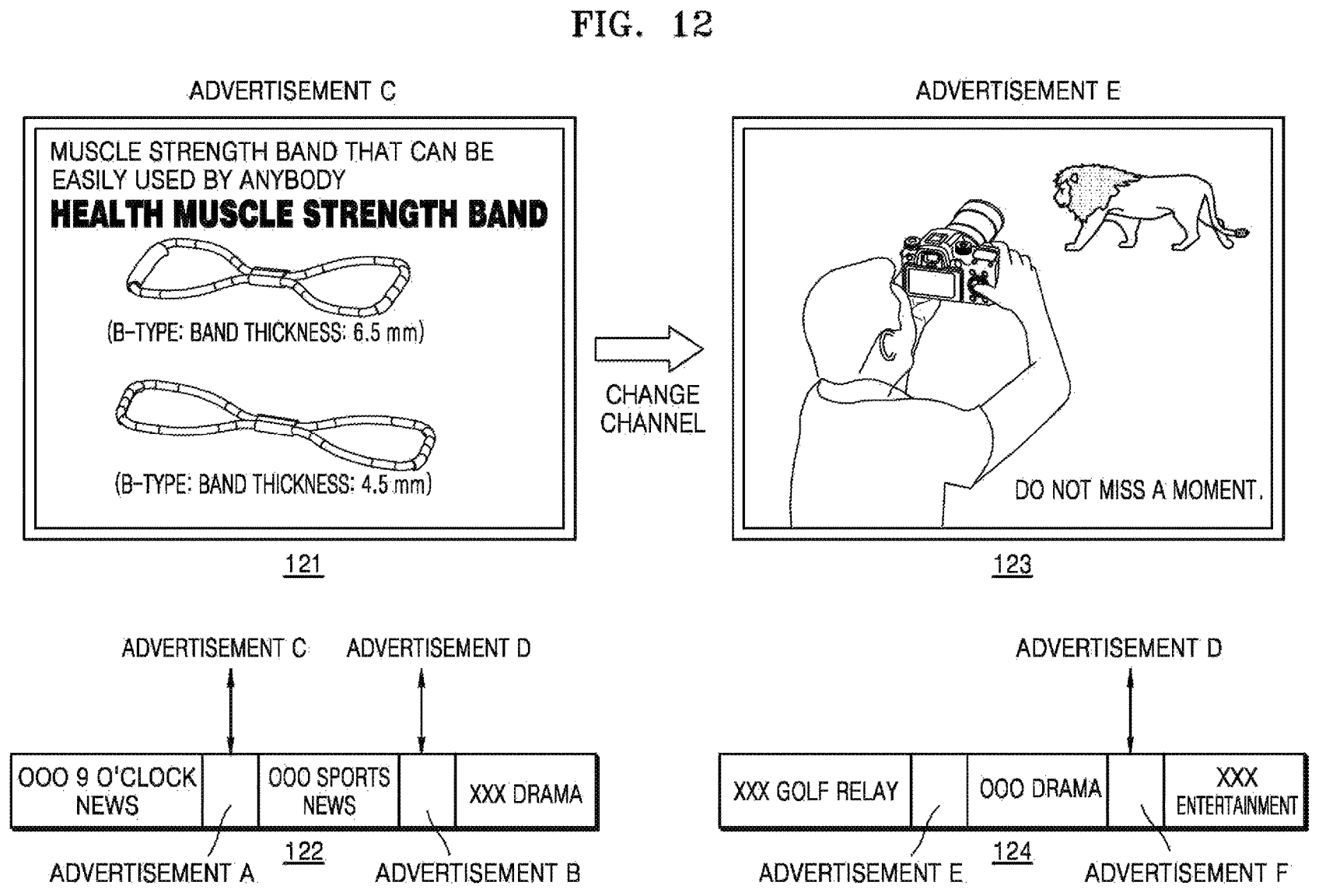

FIG. 12 is a diagram illustrating an operation of the electronic apparatus 10 when a broadcast channel changes in the electronic apparatus 10, according to an exemplary embodiment.

Referring to FIG. 12, when the broadcast channel of the electronic apparatus 10 is locked at the first broadcast channel, the electronic apparatus 10 may reproduce a broadcast program according to a broadcast schedule 122 of the first broadcast channel. The broadcast schedule 122 of the first broadcast channel may include a broadcast schedule timetable of OOO 9 o'clock news, advertisement A, OOO sports news, advertisement B, and XXX drama. Based on the profile information of the electronic apparatus 10, the electronic apparatus 10 may reproduce an image of the advertisement C at the broadcast time of the advertisement A and reproduce an image of the advertisement D at the broadcast time of the advertisement B. As illustrated in 121 of FIG. 12, the electronic apparatus 10 may reproduce an image of the advertisement C at the broadcast time of the advertisement A of the first broadcast channel.

During the reproduction of an image of the advertisement C, the user may change the broadcast channel of the electronic apparatus 10 from the first broadcast channel to the second broadcast channel. According to a control command of the user, the electronic apparatus 10 may change from the first broadcast channel to the second broadcast channel. In this case, as illustrated in 123 of FIG. 12, the electronic apparatus 10 may interrupt the reproduction of an image of the advertisement C and reproduce an image of the advertisement E broadcasted on the second broadcast channel. The electronic apparatus 10 may reproduce a broadcast program according to a broadcast schedule 124 of the second broadcast channel. The broadcast schedule 124 of the second broadcast channel may include a broadcast timetable of XXX golf relay, advertisement B, OOO drama, advertisement F, and XXX entertainment. Also, when the broadcast channel is locked at the second broadcast channel, the electronic apparatus 10 may reproduce an image of the advertisement D that is to be replaced at the broadcast time of the advertisement F of the second broadcast channel.

Figure 13:
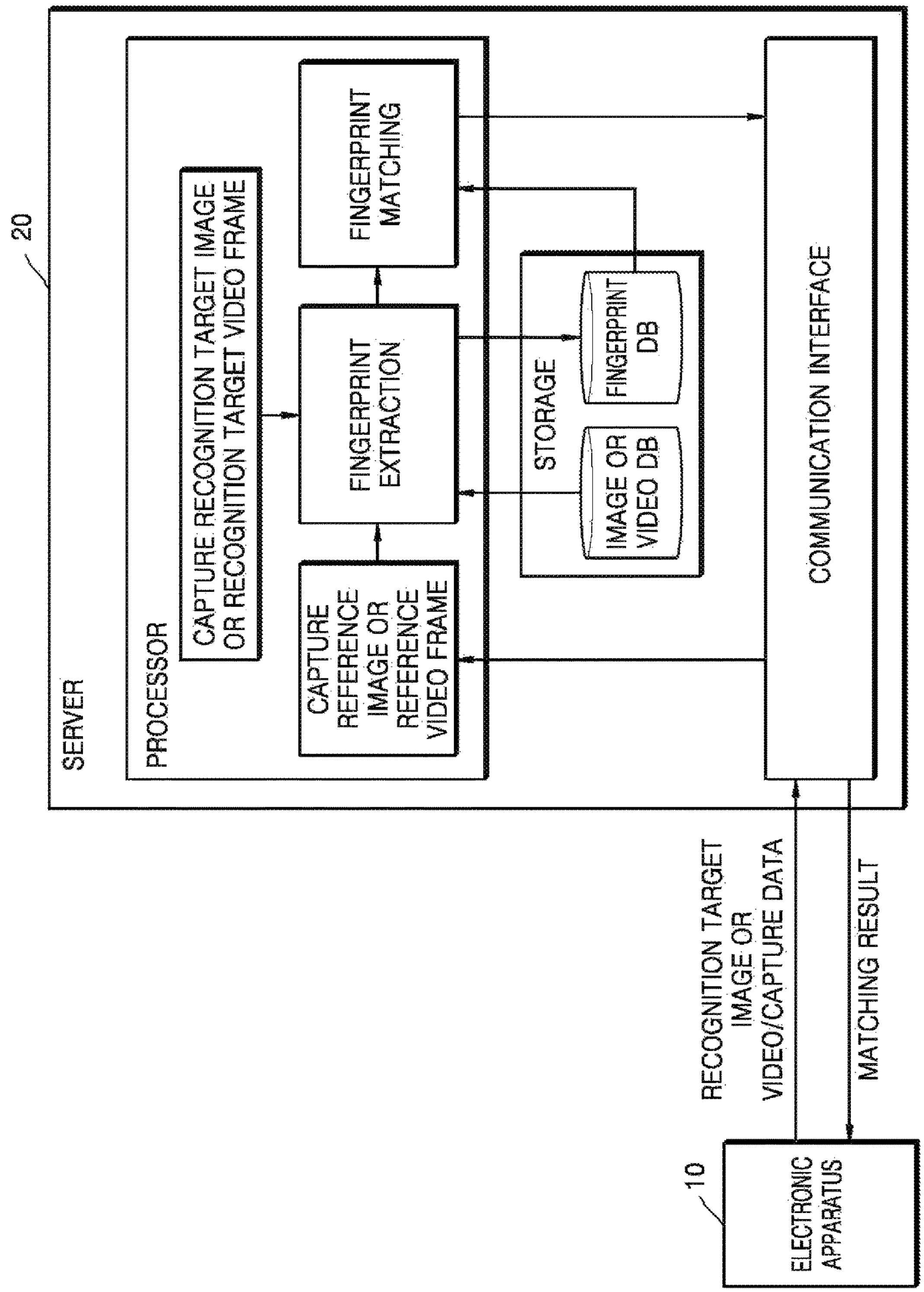
FIG. 13 is a diagram illustrating a method of recognizing an image or a video frame by using a fingerprint of the image or the video frame, according to an exemplary embodiment.

FIG. 13 is a diagram illustrating a method of recognizing an image or a video frame by using a fingerprint of the image or the video frame, according to an exemplary embodiment.

As illustrated in FIG. 13, the server 20 may extract a fingerprint from an image or a video frame and recognize the image or the video frame by using the extracted fingerprint. Although FIG. 13 illustrates the server 20 that recognizes an image or a video frame by using a fingerprint of the image or the video frame, the electronic apparatus 10 may also extract a fingerprint from an image or a video frame and recognize the image or the video frame by using the extracted fingerprint. Those of ordinary skill in the art may understand that an operation of extracting and recognizing a fingerprint by the server 20, which will be described below with reference to FIG. 13, may also be applied to the electronic apparatus 10.

As illustrated in FIG. 13, the server 20 may include a processor, a storage, and a communication interface. However, not all of the components illustrated in FIG. 13 are necessary components of the server 20. The server 20 may be implemented by more components than the components illustrated in FIG. 13, or may be implemented by less components than the components illustrated in FIG. 13.

By applying an image processing algorithm to an image or a video frame, the server 20 may uniquely recognize the image or the video frame by using a fingerprint of the image or the video frame even when the size of the image or the video frame decreases and various signal process changes occur.

The "fingerprint" may refer to an identifier for uniquely recognizing the image or the video frame. Also, the "fingerprint" may be referred to as a digital fingerprint, a digital signature, or a hash. Also, the "fingerprint technology" is a technology for extracting a unique identifier from an image or a video frame and recognize the image or the video frame by identifier comparison.

The processor may extract a fingerprint from a reference image or a reference video necessary for object recognition and store the extracted fingerprint in a fingerprint database (DB). The processor may acquire an image or a video that is a recognition target. The processor may capture an image or a video frame and extract a fingerprint based on a captured portion. By comparing the extracted fingerprint and the reference fingerprint stored in the fingerprint DB, the processor may detect the reference fingerprint matching the extracted fingerprint. The processor may recognize the image or the video based on the matched reference fingerprint.

When the image or the video frame is acquired, the processor may remove an unnecessary portion and select a certain region based on the center of the image or the video frame to extract a fingerprint. Herein, the certain region may be the entire region. Also, the processor may detect a logo and a text region in the image or the video frame and extract a fingerprint based on the detected region.

The processor may extract a fingerprint of the image or the video frame by using a color feature. Specifically, the processor may divide the image or the video frame into M×N blocks and calculate an average color of Y, Cb, and Cr components of each block $B_i$ (i=0, 1, . . . , M×N−1) according to Equation 1 below.

$$(\overline{Y_i}, \overline{Cb_i}, \overline{Cr_i}) = \frac{1}{N_b}\sum_{p \in B_i}(Y_p, Cb_p, Cr_p) \quad \text{Equation 1}$$

According to Equation 2 below, the processor may generate a 3×M×N dimensional feature vector by connecting all of the calculated block $B_i$ values.

$$F_{Color}=[\overline{Y_0},\overline{Cb_0},\overline{Cr_0}, \ldots ,\overline{Y_{M\times N-1}},\overline{Cb_{M\times N-1}},]) \quad \text{Equation 2}$$

The processor may extract a fingerprint of the image or the video frame by using the generated 3×M×N-dimensional feature vector.

Also, the processor may extract a fingerprint of the image or the video frame by using an encoded gray thumbnail (EGT) feature. Specifically, the processor may divide the image or the video frame into P×Q blocks and calculate the average of a Y value with respect to each block $B_i$. By quantizing the average of the Y value by b-bit, the processor may extract a feature according to Equation 3 below. In this case, the processor may quantize each bit by 0 and 1 by using a b number of different threshold values.

$$F_{EGT}=[Q_1(\overline{Y}_0), \ldots Q_b(\overline{Y}_0),Q_1(\overline{Y}_1), \ldots ,\overline{Q}_1(\overline{Y}_1), \ldots , Q_1(\overline{Y_{P\times Q-1}}), \ldots ,Q_b(\overline{Y_{P\times Q-1}})] \quad \text{Equation 3}$$

Also, the processor may extract a fingerprint of the image or the video frame by using a local binary pattern (LBP) histogram feature. By using a method of encoding the difference from an adjacent pixel into 0 or 1 based on the center of a particular region of the image, a local binary pattern (LBP) may be defined as Equation 4 below.

$$L(P_c) = \sum_{k=0}^{7} u(p_k - p_c - t)2^k \quad \text{Equation 4}$$

Herein, Pc is a center value of a region, and Pk (k=0, 1, . . . , 7) is an adjacent value. "u(x)" is a Heaviside step function that becomes 1 when "x" is greater than or equal to 0 and becomes 0 when "x" is smaller than 0.

Equation 4 is an example in a case where a block size is 3×3, and the block size may be set to be larger when necessary. In this case, the processor may calculate the LBP by using a difference value between a center point and an outermost point. According to the LBP, the processor may acquire an LBP histogram as in Equation 5 below.

$$F_{LBP}=[H_0,H_1, \ldots ,H_{R\times S-1}] \quad \text{Equation 5}$$

Also, the processor may extract a fingerprint of the image or the video frame by a combination of $F_{Color}$, $F_{EGT}$, $F_{LBP}$.

The storage may include an image or video DB and a fingerprint DB. The image or video DB may store an image or a video that is received by the server 20 from the electronic apparatus 10, and may store an image or a video that is acquired by the server 20. The fingerprint DB may store a fingerprint that is extracted from a reference image or a reference video that is necessary for object recognition.

The communication interface allows the server 20 to communicate data with an external apparatus. For example, the communication interface may receive an image or a video frame (i.e., a recognition target) from the electronic apparatus 10. Also, the communication interface may receive a fingerprint of an image or a video frame (i.e., a recognition target) from the electronic apparatus 10. Also, the communication interface may transmit information of a reference fingerprint, which matches a fingerprint of an image or a video frame, to the electronic apparatus 10.

Figure 14:
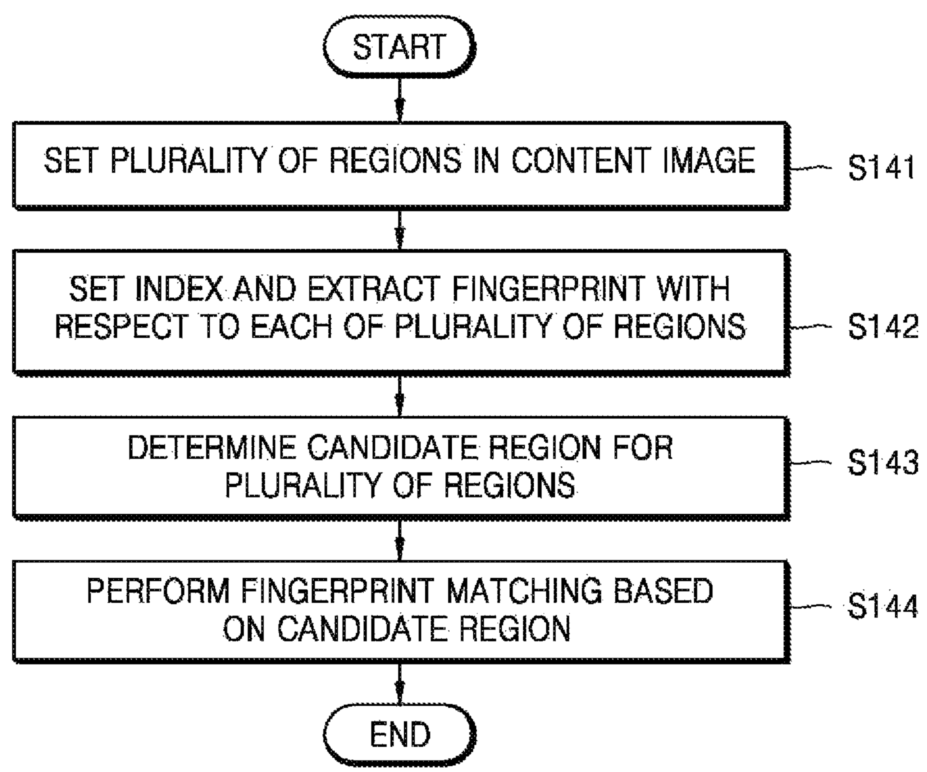
FIG. 14 is a flow diagram of a method of extracting and identifying a fingerprint based on a plurality or regions in an image of content, according to an exemplary embodiment.

FIG. 14 is a flow diagram of a method of extracting and identifying a fingerprint based on a plurality or regions in an image of content, according to an exemplary embodiment.

In operation S141, the server 20 may set a plurality of regions in a content image. For example, the server 20 may set the plurality of regions to include an overlapping region. Also, the server 20 may set the plurality of regions not to overlap each other.

In operation S142, the server 20 may set an index for each of the plurality of regions and extract a fingerprint for each of the plurality of regions. The fingerprint for each of the plurality of regions may be generated by a combination of $F_{Color}$, $F_{EGT}$, $F_{LBP}$ as described with reference to FIG. 13, or may be generated in other ways.

In operation S143, the server 20 may determine a candidate region for the plurality of regions. For example, the server 20 may determine a candidate region for the plurality of regions by using the previous matching result. When a fingerprint of an ROI #0 region is previously matched with a reference fingerprint, the server 20 may set the fingerprint of the ROI #0 region to determine whether it is matched with the reference fingerprint.

In operation S144, based on the candidate region, the server 20 may determine whether there is matching between the fingerprint of the candidate region and the reference fingerprint. Specifically, according to the priority of the candidate region, the server 20 may identify the content by detecting whether there is a reference fingerprint matching the fingerprint of the candidate region.

Figure 15:
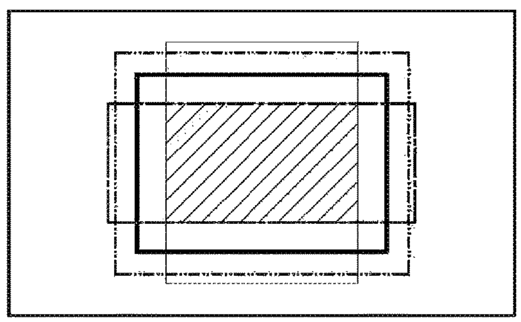
FIG. 15 is a diagram illustrating a method of extracting and identifying a fingerprint based on a plurality or regions in an image of content, according to an exemplary embodiment.

FIG. 15 is a diagram illustrating a method of extracting and identifying a fingerprint based on a plurality or regions in an image of content, according to an exemplary embodiment.

In order to minimize various truncation distortions of an image of the content, the server 20 may set a plurality of regions to include an overlapping region in a content image as illustrated in 151 of FIG. 15.

In order to extract a fingerprint by using at least one of a color feature of an image or a video frame, an encoded gray thumbnail (EGT) feature, and a local binary pattern (LBP) histogram feature, the server 20 may set a plurality of regions not to overlap each other as illustrated in 152 of FIG. 15.

Figure 16:
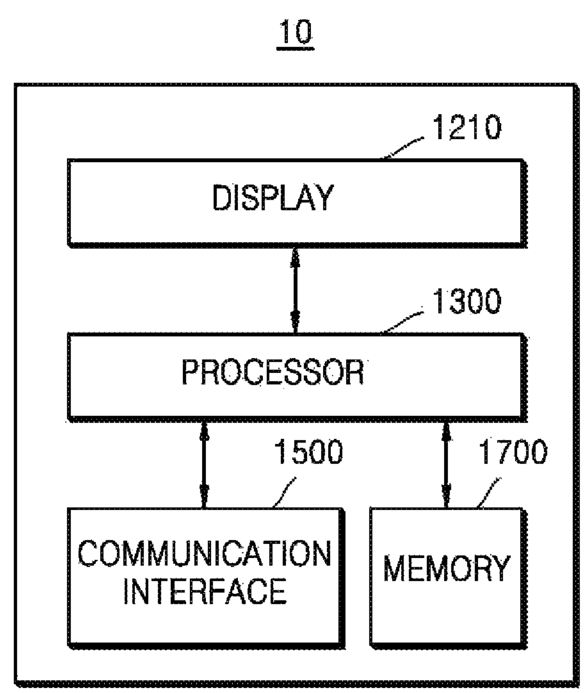

FIGS. 16 and 17 are block diagrams of an electronic apparatus according to an exemplary embodiment.

As illustrated in FIG. 16, the electronic apparatus 10 according to an exemplary embodiment may include a processor 1300, a display 1210, a communication interface 1500, and a memory 1700. However, not all of the components illustrated in FIG. 16 are necessary components of the electronic apparatus 10. The electronic apparatus 10 may be implemented by more components than the components illustrated in FIG. 16, or may be implemented by less components than the components illustrated in FIG. 16.

For example, as illustrated in FIG. 17, the electronic apparatus 10 according to some exemplary embodiments may further include a user input interface 1100, an output interface 1200, sensor 1400, and an audio/video (A/V) input interface 1600 in addition to the processor 1300, the display 1210, the communication interface 1500, and the memory 1700.

The user input interface 1100 may refer to a unit through which the user inputs data for controlling the electronic apparatus 10. For example, the user input interface 1100 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The user input interface 1100 may request a response message with respect to a voice input of the user and receive a user input for executing an operation related to the response message.

The output interface 1200 may output an audio signal, a video signal, or a vibration signal, and may include a display 1210, a speaker 1220, and a vibration motor 1230.

The display 1210 may display and output information processed by the electronic apparatus 10. For example, the display 1210 may output a broadcast program received from a set-top box or a broadcast station. Also, when the user uses a remote control to input a control command for controlling the electronic apparatus 10, the display 1210 may display an execution screen corresponding to the control command.

The speaker 1220 may output audio data received from the communication interface 1500 or stored in the memory 1700. Also, the speaker 1220 may output audio signals related to functions (e.g., call signal reception, message reception, and notification) performed by the electronic apparatus 10. When a broadcast program received from a set-top box or a broadcast station is output through the display 1210, the speaker 1220 may output an audio signal of the broadcast program.

In general, the processor 1300 may control an overall operation of the electronic apparatus 10. For example, the processor 1300 may control the overall operations of the user input interface 1100, the output interface 1200, the sensor 1400, the communication interface 1500, and the A/V input interface 1600 by executing one or more instructions or programs stored in the memory 1700. Also, by executing one or more instructions or programs stored in the memory 1700, the processor 1300 may perform the functions of the electronic apparatus 10 illustrated in FIGS. 1 to 15.

The processor 1300 may extract a fingerprint of content displayed on a display. Based on the fingerprint of the content, the processor 1300 may recognize a first broadcast channel corresponding to the content. Specifically, the processor 1300 may transmit the extracted fingerprint of the content to a server and receive information of the first broadcast channel corresponding to the content from the server. Herein, the first broadcast channel may be determined based on a comparison result between the fingerprint of the content and a fingerprint of an image of each of broadcast channels.

The processor 1300 may extract a fingerprint of the content at predetermined time intervals and determine, based on the fingerprint extracted at the predetermined time intervals, whether the first broadcast channel is continuously output on the display. For example, the processor 1300 may extract a fingerprint of the content 5 times at intervals of 3 seconds and determine whether there is a fingerprint of a broadcast channel that matches the fingerprints extracted 5 times at intervals of 3 seconds. When the fingerprints of the broadcast channel matching the fingerprints extracted 5 times at intervals of 3 seconds are identical to each other, the processor 1300 may determine that the broadcast channel corresponding to the content is continuously output.

When it is determined that the first broadcast channel is continuously output on the display, the processor 1300 may request information of a broadcast fingerprint of the first broadcast channel from the server.

The processor 1300 may receive a notification indicating a broadcast schedule of a replacement target existing advertisement in the first broadcast channel from the server. The broadcast schedule of the replacement target existing advertisement may be determined according to a comparison between an advertisement fingerprint of the first broadcast channel and an advertisement fingerprint of the replacement target existing advertisement.

The processor 1300 may receive a broadcast fingerprint of the first broadcast channel, in which an advertisement replacement event including information of the start point of the replacement target existing advertisement is set, from the server.

When it is determined that a broadcast schedule of the replacement target existing advertisement is included in a broadcast schedule of the first broadcast channel, the processor 1300 may download a replacement advertisement from the server based on a start point of the replacement target existing advertisement.

The processor 1300 may determine a current reproduction position of the first broadcast channel by comparing the broadcast fingerprint of the first broadcast channel and a fingerprint of content displayed in real time on the display. The processor 1300 may download at least a portion of the replacement advertisement before the start point of the replacement target existing advertisement based on the determined current reproduction position.

The processor 1300 may reproduce the replacement advertisement at an advertisement time of the replacement target existing advertisement of the first broadcast channel. The processor 1300 may set a second layer on a first layer where a broadcast of the first broadcast channel is output and reproduce the replacement advertisement on the second layer.

When an execution screen for control of the electronic apparatus 10 is called, the processor 1300 may acquire a difference image between an image of only the replacement target existing advertisement and an image of the replacement target existing advertisement including the execution screen. The processor 1300 may display the execution screen overlappingly on an image of the replacement advertisement based on the difference image.

When the first broadcast channel changes into a second broadcast channel, the processor 1300 may interrupt the reproduction of the replacement advertisement and display a screen broadcasted on the second broadcast channel on the display.

The processor 1300 may set a plurality of regions in an image of the content and extract a fingerprint of the content based on a pixel value of the plurality of regions.

The processor 1300 may be implemented by an array of logic gates, or may be implemented by a combination of a general-purpose microprocessor and a memory that stores a program executable in the general-purpose microprocessor. Also, those of ordinary skill in the art will understand that the processor 1300 may be implemented by other types of hardware.

The sensor 1400 may detect a state of the electronic apparatus 10 or a peripheral state of the electronic apparatus 10 and transmit the detected information to the processor 1300.

The sensor 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., GPS sensor) 1460, a pressure sensor 1470, a proximity sensor 1480, and an RGB sensor (illuminance sensor) 1490. Because those of ordinary skill in the art may intuitively infer the respective functions of the sensors from the respective names thereof, detailed descriptions thereof will be omitted for conciseness.

The communication interface 1500 may include one or more components for allowing the electronic apparatus 10 to communicate with another apparatus or the server 20. The other apparatus may be, but is not limited to, a sensing apparatus or a computing apparatus such as the electronic apparatus 10. For example, as illustrated in FIG. 17, the communication interface 1500 may include a short-range wireless communication interface 1510, a mobile communication interface 1520, and a broadcast receiver 1530.

The short-range wireless communication interface 1510 may include, but is not limited to, a Bluetooth communication interface, a Bluetooth Low Energy (BLE) communication interface, a near field communication interface, a WLAN (WiFi) communication interface, a ZigBee communication interface, an infrared data association (IrDA) communication interface, a WiFi Direct (WFD) communication interface, a ultra wideband (UWB) communication interface, and an Ant+ communication interface.

The mobile communication interface 1520 may communicate wireless signals with at least one of a base station, an external terminal, and a server on a mobile communication network. Herein, the wireless signals may include voice call signals, video call signals, or various types of data for transmission and reception of text/multimedia messages.

The broadcast receiver 1530 may receive broadcast signals and/or broadcast-related information from external devices through broadcast channels. The broadcast channels may include satellite channels and terrestrial channels. In some exemplary embodiments, the electronic apparatus 10 may not include the broadcast receiver 1530.

Also, the communication interface 1500 may request a response message with respect to a voice input of the user and communicate information, which is necessary to execute an operation related to the response message, with another apparatus or the server 20.

The A/V input interface 1600 may be used to input audio signals or video signals and may include, for example, a camera 1610 and a microphone 1620. The camera 1610 may obtain an image frame such as a still image or a moving image through an image sensor in a video call mode or a photographing mode. The image captured through the image sensor may be processed by the processor 1300 or a separate image processing unit. The image captured by the camera 1610 may be used as context information of the user.

The microphone 1620 may receive an input of an external audio signal and process the same into electrical audio data. For example, the microphone 1620 may receive an audio signal from an external device or the user. The microphone 1620 may receive a voice input of the user. The microphone 1620 may use various noise cancellation algorithms for canceling a noise that may be generated in the process of receiving an input of an external audio signal.

The memory 1700 may store one or more instructions for processing and controlling operations of the processor 1300, and may store data that is input to the electronic apparatus 10 or output from the electronic apparatus 10.

The memory 1700 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

The programs stored in the memory 1700 may be classified into a plurality of modules according to their functions and may be classified into, for example, a user interface (UI) module 1710, a touchscreen module 1720, and a notification module 1730.

The UI module 1710 may provide, for example, a specialized UI and a graphical user interface (GUI) that interlock with the electronic apparatus 10 for each application. The touchscreen module 1720 may detect a touch gesture of the user on the touchscreen and transmit information about the touch gesture to the processor 1300. According to some exemplary embodiments, the touchscreen module 1720 may recognize and analyze a touch code. The touchscreen module 1720 may include separate hardware including a controller.

The notification module 1730 may generate a signal for notifying the occurrence of an event in the electronic apparatus 10. Examples of the event occurring in the electronic apparatus 10 may include call signal reception, message reception, key signal input, and schedule notification. The notification module 1730 may output a notification signal of a video signal type through the display 1210, output a notification signal of an audio signal type through the speaker 1220, and output a notification signal of a vibration signal type through the vibration motor 1230.

Figure 18:
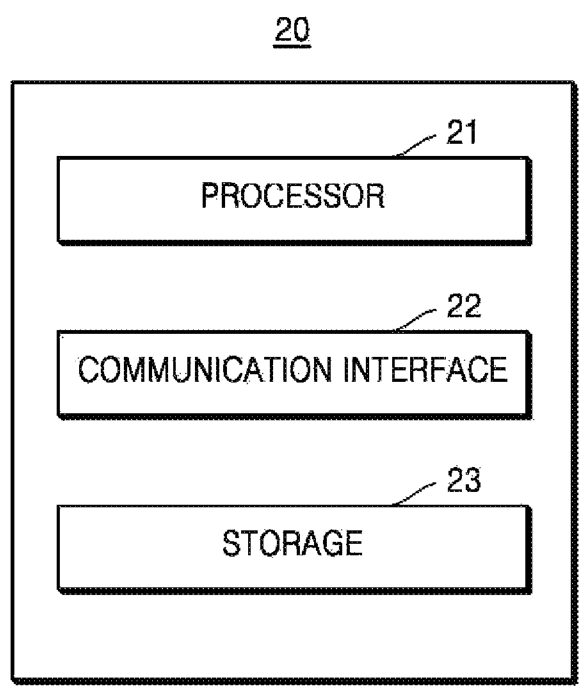
FIG. 18 is a block diagram of a server according to an exemplary embodiment.

FIG. 18 is a block diagram of the server 20 according to an exemplary embodiment.

As illustrated in FIG. 18, the server 20 may include a processor 21, a communication interface 22, and a storage 23. However, not all of the illustrated components are necessary components. The server 20 may be implemented by more components than the illustrated components, or may be implemented by less components than the illustrated components. The above components will be described below.

The processor 21 may receive broadcast information about each of broadcast channels from a broadcast station. The server 20 may extract a broadcast fingerprint of each of the broadcast channels.

The processor 21 may receive a fingerprint of content displayed on the electronic apparatus 10 from the electronic apparatus 10. The processor 21 may determine a first broadcast channel corresponding to the content by comparing the fingerprint of the content and a fingerprint of an image of each of the broadcast channels.

Based on a broadcast schedule of the first broadcast channel, the processor 21 may determine whether a replacement target existing advertisement is scheduled to be broadcasted in the electronic apparatus 10. Specifically, the processor 21 may determine whether an advertisement fingerprint of the replacement target existing advertisement in the electronic apparatus 10 is included in an advertisement fingerprint of the first broadcast channel. The processor 21 may add and store start point information of the existing advertisement in a broadcast fingerprint of the first broadcast channel when it is determined that the advertisement fingerprint of the existing advertisement is included in the advertisement fingerprint of the first broadcast channel. The processor 21 may transmit the stored broadcast fingerprint of the first broadcast channel to the electronic apparatus 10.

The processor 21 may transmit a replacement advertisement to the electronic apparatus 10 based on a start point of the existing advertisement when the replacement target existing advertisement is scheduled to be broadcasted in the electronic apparatus 10.

The communication interface 22 may include one or more components for allowing the server 20 to communicate with another apparatus or the electronic apparatus 10. The other apparatus may be, but is not limited to, a sensing apparatus or a computing apparatus such as the electronic apparatus 10.

For example, the communication interface 22 may be connected to the electronic apparatus 10 through a wireless communication network according to WiFi or WiFi Direct. Specifically, the wireless communication network through which the communication interface 22 is connected may include, but is not limited to, wireless LAN, WiFi, Bluetooth, ZigBee, WiFi Direct (WFD), ultra wideband (UWB), infrared data association (IrDA), Bluetooth Low Energy (BLE), and near field communication (NFC).

The storage 23 may store, for example, information received from the electronic apparatus 10, information to be transmitted to the electronic apparatus 10, information received from the external server 20, information to be transmitted to the external server 20, and information generated in the server 20.

The server 20 may include a central operation processor to control the overall operations of the processor 21, the communication interface 22, and the storage 23. The central operation processor may be implemented by an array of logic gates, or may be implemented by a combination of a general-purpose microprocessor and a memory that stores a program executable in the general-purpose microprocessor. Also, those of ordinary skill in the art will understand that the central operation processor may be implemented by other types of hardware.

Figure 19:
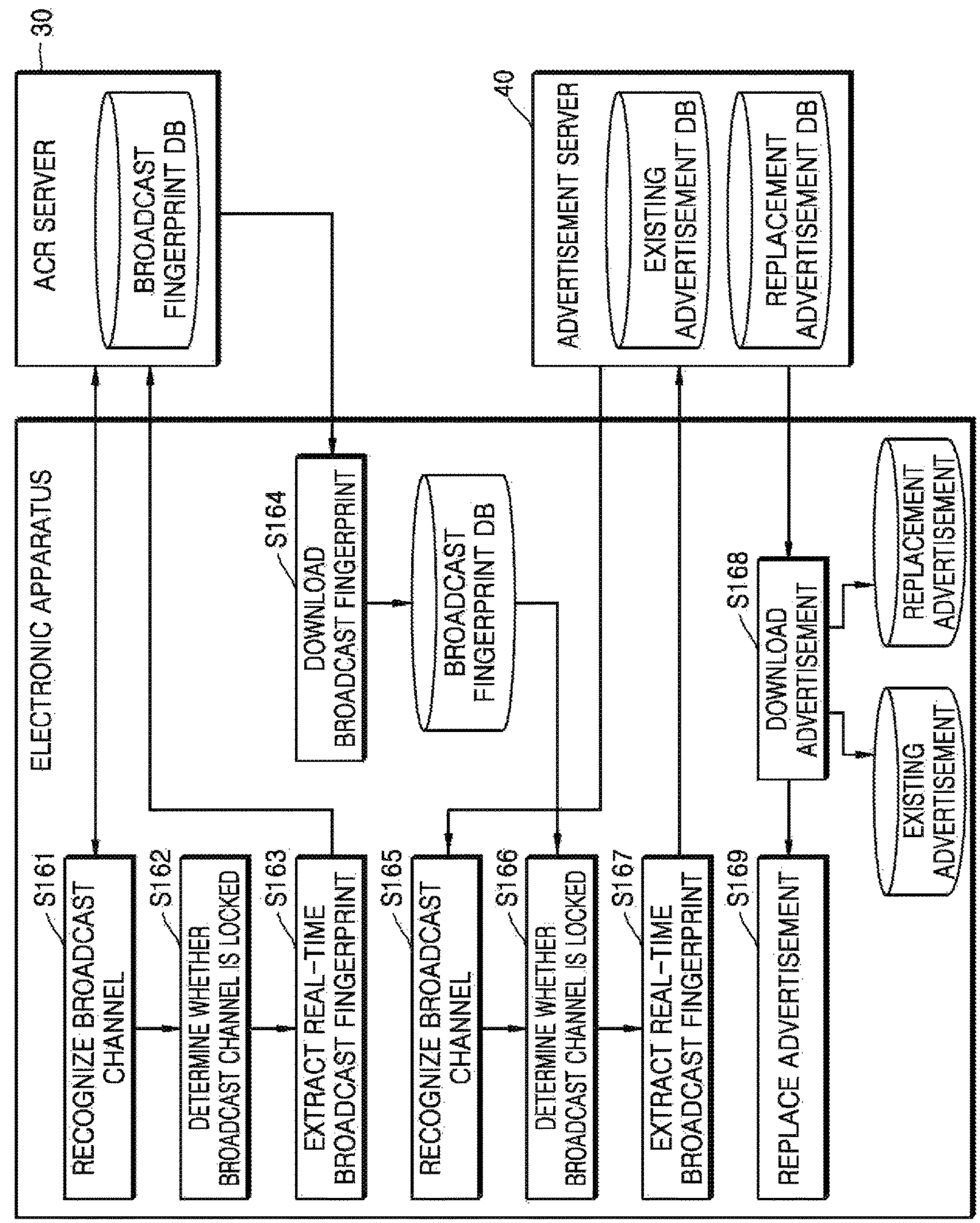
FIG. 19 is a diagram illustrating a system for replacing an advertisement of a broadcast program in an electronic apparatus, according to an exemplary embodiment.

FIG. 19 is a diagram illustrating a system for replacing an advertisement of a broadcast program in the electronic apparatus 10, according to an exemplary embodiment.

In operation S161, based on a fingerprint of content displayed on a display of the electronic apparatus 10, the electronic apparatus 10 may recognize a first broadcast channel corresponding to the content. Specifically, the electronic apparatus 10 may extract a fingerprint of the content. The electronic apparatus 10 may transmit the extracted fingerprint of the content to an ACR server 30. The ACR server 30 may acquire a fingerprint of an image of each of the broadcast channels. The ACR server 30 may receive a broadcast signal of each of the broadcast channels from a broadcast station and extract a fingerprint of an image of each of the broadcast channels from the broadcast signal of each of the broadcast channels. In this case, the ACR server 30 may receive a broadcast signal, which is identical to the broadcast signal received from the electronic apparatus 10, from the broadcast station a few seconds before. By comparing the fingerprint of an image of each of the broadcast channels and the fingerprint of the content received from the electronic apparatus 10, the ACR server 30 may detect a fingerprint of the first broadcast channel that matches the fingerprint of the content. The ACR server 30 may determine the first broadcast channel of the matched fingerprint as a broadcast channel of the content and acquire information of the first broadcast channel. The electronic apparatus 10 may receive the information of the first broadcast channel from the ACR server 30 and recognize the broadcast channel of the content displayed on the electronic apparatus 10 as the first broadcast channel.

In operation S162, the electronic apparatus 10 may determine whether the first broadcast channel corresponding to the content displayed on the display of the electronic apparatus 10 is locked. The electronic apparatus 10 may extract a fingerprint of the content a predetermined number of times at predetermined time intervals. When the fingerprint of the content extracted a predetermined number of times at predetermined time intervals is identical to a broadcast fingerprint of the first broadcast channel, the electronic apparatus 10 may determine that the first broadcast channel corresponding to the content displayed on the display is locked.

In operation S163, the electronic apparatus 10 may extract a broadcast fingerprint of the content displayed on the display in real time.

In operation S164, the electronic apparatus 10 may receive a broadcast fingerprint of the first broadcast channel from the ACR server 30.

In operation S165, the electronic apparatus 10 may receive information of a replacement advertisement and information of a replacement target existing advertisement, among the existing advertisements included in a broadcast schedule of the first broadcast channel, from an advertisement server 40.

In operation S166, the electronic apparatus 10 may determine a current reproduction position of the first broadcast channel by comparing the broadcast fingerprint of the first broadcast channel and the broadcast fingerprint of the content extracted in real time.

In operation S167, the electronic apparatus 10 may request to download an image of the replacement target existing advertisement and an image of the replacement advertisement from the advertisement server 40 before the start point of the replacement target existing advertisement of the first broadcast channel.

In operation S168, the electronic apparatus 10 may download an image of the replacement target existing advertisement and an image of the replacement advertisement from the advertisement server 40.

In operation S169, the electronic apparatus 10 may reproduce the replacement advertisement at an advertisement time of the replacement target existing advertisement of the first broadcast channel.

FIG. 20 is a diagram illustrating a system for replacing an advertisement of a broadcast program in the electronic apparatus 10, according to another exemplary embodiment.

As illustrated in FIG. 20, the electronic apparatus 10 may include a frame capture module that captures a screen displayed on the display of the electronic apparatus 10; a fingerprint extractor module that extracts a fingerprint; a server matching module for recognizing a station and a broadcast channel viewed by the user of the electronic apparatus 10; a channel locker that determines a broadcast channel that is currently viewed by the user of the electronic apparatus 10; a fingerprint receiver module that receives a fingerprint with a dynamic advertisement replacement (DAR) event added thereto; a broadcast fingerprint local matching module that determines a current reproduction position of the content by matching a broadcast fingerprint and a fingerprint extracted in the electronic apparatus 10; a broadcast reproduction position estimating module that estimates an accurate reproduction position by using the existing matching information; a DAR event manager that generally manages and controls a DAR event; a video loader that interlocks with a player by downloading an image file of the replacement advertisement; and a video player that reproduces the replacement advertisement. Not all of the above components of the electronic apparatus 10 are necessary components of the electronic apparatus 10. The electronic apparatus 10 may be implemented by more components than the above components, or may be implemented by less components than the above components.

As illustrated in FIG. 12, the server 20 may include a capture server that receives a plurality of broadcasts, receives a fingerprint, and extract a fingerprint; a matching server that recognizes a channel by matching a fingerprint transmitted by the electronic apparatus 10 and a reference broadcast fingerprint stored in a database; an advertisement matching server that recognizes a DAR target advertisement by using the fingerprint captured by the capture server; a DAR event server that transmits a DAR-related event to the electronic apparatus 10; an EPG server that provides broadcast program information; an advertisement server that provides an advertisement replacement list, a replacement advertisement, or a replacement target advertisement; and a fingerprint transmitter that transmits a DAR-related event with a DAR event of a real-time broadcast added thereto to the electronic apparatus 10. However, not all of the above components of the server 20 are necessary components of the server 20. The server 20 may be implemented by more components than the above components, or may be implemented by less components than the above components.

A method of replacing an advertisement displayed on the electronic apparatus 10 may include a channel locking operation for determining by the electronic apparatus 10 what broadcast channel is currently viewed; and an advertisement replacement operation for performing advertisement replacement by accurately recognizing an advertisement replacement point in a state where a broadcast channel is locked.

In the channel locking operation, the electronic apparatus 10 may determine a broadcast channel that is currently viewed by the user of the electronic apparatus 10. The server 20 may recognize, through the advertisement matching server, that a replacement target advertisement is scheduled to be broadcasted, notify the electronic apparatus 10 that advertisement replacement should be prepared, and allow the electronic apparatus 10 to download a broadcast fingerprint and a replacement advertisement therefrom. The electronic apparatus 10 may accurately detect an advertisement replacement point by matching a downloaded broadcast fingerprint and a fingerprint extracted by the electronic apparatus 10 while downloading a broadcast fingerprint in real time. The electronic apparatus 10 may perform advertisement replacement at the advertisement replacement point. The electronic apparatus 10 may continuously recognize a screen change, which is caused for example by broadcast channel switching or the display (e.g., On-Screen Display (OSD)) of an execution screen for control of a set-top box, by matching the downloaded broadcast fingerprint and the fingerprint extracted by the electronic apparatus 10, even while an advertisement is reproduced after the advertisement replacement is completed. When necessary, the electronic apparatus 10 may stop the reproduction of a replaced advertisement. Also, the electronic apparatus 10 may transmit information about whether the advertisement replacement is normally completed to the server.

As illustrated in FIG. 20, in the channel locking operation, the components of the electronic apparatus 10 and the components of the server 20 may operate as follows. In operation S2010, a broadcast signal received in the capture server may be identical to a broadcast signal received in the electronic apparatus 10. The capture server may receive a broadcast signal earlier than the time when the electronic apparatus 10 receives a broadcast signal, and extract a broadcast fingerprint based on the broadcast signal. The capture server may interlock the extracted broadcast fingerprint with the broadcast metadata received from the EPG server and transmit the interlocking result to an indexing module in the advertisement matching server. The indexing module may index the fingerprint information and store the same in a broadcast fingerprint database (DB). Also, those of ordinary skill in the art will understand that the EPG metadata interlocking may be performed by the indexing module according to a server configuration.

In operation S2020, the frame capture module may capture the content (e.g., audio, video frames, and images) output from the electronic apparatus 10, the fingerprint extractor module may extract a fingerprint based on the extracted content.

In operation S2030, the fingerprint extractor module may transmit the extracted fingerprint to an ACR matching client.

In operation S2040, the ACR matching client may transmit an ACR query to an ACR matching server to request the recognition of a broadcast channel. Based on the ACR query, the ACR matching server may perform matching with a broadcast fingerprint of the broadcast channels stored and indexed in real time and transmit the matched broadcast channel information to the ACR matching client.

In operation S2050, the ACR matching client may provide the matching result (the matched broadcast channel information) to the channel locker, and the channel locker may determine whether the matched broadcast channel is continuously viewed in the electronic apparatus 10. As a result of the determination, when the matched broadcast channel is continuously viewed in the electronic apparatus 10, the channel locker may determine that the broadcast channel being viewed in the electronic apparatus 10 is in a locked state.

In operation S2060, the determined broadcast channel information may be transmitted to the DAR event manager, and the DAR event manager may perform a DAR event-related process.

As illustrated in FIG. 20, in the advertisement replacement operation, the components of the electronic apparatus 10 and the components of the server 20 may operate as follows. In operation S2101, the advertisement server may receive information of a replacement advertisement and information about a replacement target advertisement determined based on the profile information of the electronic apparatus 10. The advertisement server may extract a fingerprint of the replacement target advertisement and transmit the extracted fingerprint to an on-demand indexing server, and the on-demand indexing server may index/store the fingerprint transmitted in an advertisement fingerprint database.

In operation S2102, the advertisement matching server may receive a broadcast fingerprint from the capture server.

In operation S2103, by using the broadcast fingerprint information received from the capture server, the advertisement matching server may determine whether there is a replacement target advertisement stored in the advertisement fingerprint database. When the replacement target advertisement is not included in the broadcast fingerprint information, the advertisement matching server may index/store the broadcast fingerprint information received from the capture server.

In operation S2104, when the replacement target advertisement is included in the broadcast fingerprint information, the advertisement matching server may add information of a start point of the replacement target advertisement to the broadcast fingerprint and index/store the same in the broadcast fingerprint database. The advertisement matching server may notify the DAR event server that the start point of the replacement target advertisement is detected.

In operation S2105, the DAR event server may transmit a notification indicating that the start point of the replacement target advertisement is detected to the DAR event manager of the electronic apparatus 10.

In operation S2106, the DAR event manager may trigger a fingerprint receiver to download a broadcast fingerprint from the server.

In operation S2107, the fingerprint receiver may download a broadcast fingerprint from the server. A DAR event may be mapped to the received broadcast fingerprint at the position of a particular fingerprint.

In operation S2108, when receiving the information indicating that the replacement target advertisement is started from the DAR event server, the DAR event manager may request the video loader to download a replacement advertisement.

In operation S2109, the video loader may download the replacement advertisement from the advertisement server. When the capacity of a storage space of the electronic apparatus 10 is sufficient, the video loader may download all of the replacement advertisement. When the capacity of a storage space of the electronic apparatus 10 is not sufficient, the video loader may first download only a start portion of the replacement advertisement, download the remaining portion thereof in a streaming manner during the reproduction of an image of the replacement advertisement, and connect the same by a video player. In this case, a DAR event may be a preloading video event for downloading all or part of the replacement advertisement, a play video event for playing a new advertisement, an end video event for ending the advertisement play when an advertisement period ends, or a stop video event for stopping the advertisement play when a screen state changes in a state where the advertisement does not end (for example, when the channel is changed, or when an OSD is output on the screen of an existing advertisement because the user presses a remote control button of the electronic apparatus 10).

In operation S2110, the DAR event manager may request the broadcast fingerprint local matching module to start local matching.

In operation S2111, the broadcast fingerprint local matching module may match the broadcast fingerprint received from the server and the fingerprint extracted by the electronic apparatus 10 and provide the current fingerprint matching information and the DAR event information to the broadcast reproduction position estimating module.

In operation S2112, the broadcast reproduction position estimating module may determine an accurate broadcast reproduction point by using the fingerprint local matching information and provide suitable DAR event information to the DAR event manager at the determined point.

In operation S2113, the DAR event manager may request the video player to reproduce the replacement advertisement at the point of the replacement target advertisement.

In operation S2114, the video player may reproduce the replacement advertisement according to the request of the DAR event manager.

Exemplary embodiments may also be implemented in the form of a computer-readable recording medium including instructions executable by a computer, such as program modules executed by a computer. The computer-readable recording medium may be any available medium accessible by a computer and may include all of volatile or non-volatile mediums and removable or non-removable mediums. Also, the computer-readable recording medium may include all of computer storage mediums and communication mediums. The computer storage mediums may include all of volatile or non-volatile mediums and removable or non-removable mediums that are implemented by any method or technology to store information such as computer-readable instructions, data structures, program modules, or other data. For example, the communication mediums may include any information transmission medium and may include other transmission mechanisms or other data of modulated data signals such as carriers, computer-readable instructions, data structures, or program modules.

Also, herein, a "unit" may include a hardware component such as a processor or a circuit, and/or a software component executed by a hardware component such as a processor.

The foregoing is illustrative of the exemplary embodiments and is not to be construed as limiting thereof. Although the exemplary embodiments have been described above, those of ordinary skill in the art will readily understand that various modifications are possible in the exemplary embodiments without materially departing from the concepts and features of the exemplary embodiments. Therefore, it is to be understood that the exemplary embodiments described above should be considered in a descriptive sense only and not for purposes of limitation. For example, elements described as being combined may also be implemented in a distributed manner, and elements described as being distributed may also be implemented in a combined manner.

Therefore, the scope of the inventive concept is defined not by the detailed description of the exemplary embodiments but by the appended claims, and all modifications or differences within the scope should be construed as being included in the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic apparatus comprising:

a communication interface;

a display;

a memory configured to store one or more instructions; and a processor configured to execute the one or more instructions stored in the memory, wherein, when executed, the one or more instructions cause the processor to:

extract a plurality of fingerprints of content displayed on the display;

recognize, based on the plurality of fingerprints, a first broadcast channel corresponding to the content displayed on the display;

determine, based on the plurality of fingerprints, a period of time during which the first broadcast channel is output on the display;

based on the period of time being greater than a predetermined period of time, request a broadcast fingerprint of the first broadcast channel from a server;

in response to determining, based on the broadcast fingerprint, that a broadcast schedule of a replacement target existing advertisement is included in a broadcast schedule of the first broadcast channel, download a replacement advertisement from the server based on a start point of the replacement target existing advertisement; and reproduce the replacement advertisement at an advertisement time of the replacement target existing advertisement of the first broadcast channel, wherein the plurality of fingerprints are extracted at regular intervals, and wherein the period of time is determined by counting a number of sequential fingerprints from among the plurality of fingerprints which correspond to the first broadcast channel.

2. The electronic apparatus of claim 1, wherein the one or more instructions further cause the processor to extract the plurality of fingerprints of the content; and transmit information of the plurality of fingerprints of the content to the server and receive information of the first broadcast channel corresponding to the content from the server, wherein the first broadcast channel is determined based on a comparison result between the fingerprint of the content and a fingerprint of an image of each of broadcast channels.

3. The electronic apparatus of claim 1, wherein the one or more instructions further cause the processor to receive a notification indicating the broadcast schedule of the replacement target existing advertisement in the first broadcast channel from the server, wherein the broadcast schedule of the replacement target existing advertisement is determined according to a comparison between an advertisement fingerprint of the first broadcast channel and an advertisement fingerprint of the replacement target existing advertisement.

4. The electronic apparatus of claim 1, wherein the one or more instructions further cause the processor to receive a broadcast fingerprint of the first broadcast channel, in which an advertisement replacement event including information of the start point of the replacement target existing advertisement is set, from the server.

5. The electronic apparatus of claim 3, wherein the one or more instructions further cause the processor to determine a current reproduction position of the first broadcast channel by comparing a broadcast fingerprint of the first broadcast channel and a fingerprint of content displayed in real time on the display; and download at least a portion of the replacement advertisement before the start point of the replacement target existing advertisement based on the determined current reproduction position.

6. The electronic apparatus of claim 1, wherein the one or more instructions further cause the processor to set a second layer on a first layer where a broadcast of the first broadcast channel is output and reproduce the replacement advertisement on the second layer.

7. The electronic apparatus of claim 1, wherein the one or more instructions further cause the processor to, based on an execution screen for control of the electronic apparatus being called, display the execution screen overlappingly on an image of the replacement advertisement based on a difference image between an image of the replacement target existing advertisement and an image of the replacement target existing advertisement including the execution screen.

8. The electronic apparatus of claim 1, wherein the one or more instructions cause the processor to, in response to the first broadcast channel changing into a second broadcast channel, interrupt the reproduction of the replacement advertisement and display a screen broadcasted on the second broadcast channel on the display.

9. The electronic apparatus of claim 1, wherein the one or more instructions further cause the processor to set a plurality of regions in an image of the content and extract the fingerprint of the content based on a pixel value of the plurality of regions.

10. The electronic apparatus of claim 1, wherein the one or more instructions further cause the processor to:

set a second layer on a first layer where a broadcast of the first broadcast channel is output and reproduce the replacement advertisement on the second layer; and set a third layer on the second layer where the replacement advertisement is output and display an execution screen on the third layer, wherein the third layer covers at least a portion of the second layer, and the second layer covers at least a portion of the first layer.

11. A method of operating an electronic apparatus, the method comprising:

extracting a plurality of fingerprints of content displayed on a display of the electronic apparatus;

recognizing, based on the plurality of fingerprints, a first broadcast channel corresponding to the content displayed on the display;

determining, based on the plurality of fingerprints, a period of time during which the first broadcast channel is output on the display;

based on the period of time being greater than a predetermined period of time, requesting a broadcast fingerprint of the first broadcast channel from a server;

in response to determining, based on the broadcast fingerprint, that a broadcast schedule of a replacement target existing advertisement is included in a broadcast schedule of the first broadcast channel, downloading a replacement advertisement from the server based on a start point of the replacement target existing advertisement; and reproducing the replacement advertisement at an advertisement time of the replacement target existing advertisement of the first broadcast channel, wherein the plurality of fingerprints are extracted at regular intervals, and wherein the period of time is determined by counting a number of sequential fingerprints from among the plurality of fingerprints which correspond to the first broadcast channel.

12. The method of claim 11, further comprising receiving a notification indicating the broadcast schedule of the replacement target existing advertisement in the first broadcast channel from the server, wherein the broadcast schedule of the replacement target existing advertisement is determined according to a comparison between an advertisement fingerprint of the first broadcast channel and an advertisement fingerprint of the replacement target existing advertisement.

13. The method of claim 11, further comprising receiving a broadcast fingerprint of the first broadcast channel, in which an advertisement replacement event including information of the start point of the replacement target existing advertisement is set, from the server, wherein the downloading of the replacement advertisement from the server comprises:

determining a current reproduction position of the first broadcast channel by comparing the broadcast fingerprint of the first broadcast channel and a fingerprint of content displayed in real time on the display; and downloading at least a portion of the replacement advertisement before the start point of the replacement target existing advertisement based on the determined current reproduction position.

14. The method of claim 11, wherein the reproducing of the replacement advertisement comprises setting a second layer on a first layer where a broadcast of the first broadcast channel is output, and reproducing the replacement advertisement on the second layer.

15. The method of claim 11, wherein based on an execution screen for control of the electronic apparatus being called, display the execution screen overlappingly on an image of the replacement advertisement based on a difference image between an image of the replacement target existing advertisement and an image of the replacement target existing advertisement including the execution screen.

16. The method of claim 11, further comprising, in response to the first broadcast channel changing into a second broadcast channel, interrupting the reproducing of the replacement advertisement and displaying a screen broadcasted on the second broadcast channel on the display.

17. A server comprising:

a communication interface;

a storage storing one or more instructions; and a processor configured to execute the one or more instructions stored in the storage, wherein when executed, the one or more instructions cause the processor to:

receive broadcast information about each of broadcast channels from a broadcast station and extract a broadcast fingerprint of an image of each of the broadcast channels;

receive a fingerprint of content displayed on an electronic apparatus from the electronic apparatus, wherein the fingerprint of the content is sent by the electronic apparatus based on the content being displayed on the electronic apparatus for a period of time that is greater than a predetermined period of time;

determine a first broadcast channel corresponding to the content by comparing the fingerprint of the content and the broadcast fingerprint of the image of each of the broadcast channels;

determine, based on a broadcast schedule of the first broadcast channel, whether a replacement target existing advertisement is scheduled to be broadcasted in the electronic apparatus; and transmit a replacement advertisement to the electronic apparatus based on a start point of the replacement target existing advertisement when the replacement target existing advertisement is scheduled to be broadcasted in the electronic apparatus, wherein the fingerprint of the content is included in a plurality of fingerprints of the content, wherein the plurality of fingerprints of the content are extracted at regular intervals, and wherein the period of time is determined by counting a number of sequential fingerprints of the content from among the plurality of fingerprints of the content which correspond to the first broadcast channel.

18. The server of claim 17, wherein the one or more instructions further cause the processor to:

determine whether an advertisement fingerprint of the replacement target existing advertisement in the electronic apparatus is included in an advertisement fingerprint of the first broadcast channel;

add and store start point information of the replacement target existing advertisement in a broadcast fingerprint of the first broadcast channel in response to determining that the advertisement fingerprint of the replacement target existing advertisement is included in the advertisement fingerprint of the first broadcast channel; and transmit the broadcast fingerprint of the first broadcast channel to the electronic apparatus.

19. A method of operating a server, the method comprising:

receiving broadcast information about each of broadcast channels from a broadcast station and extracting a broadcast fingerprint of an image of each of the broadcast channels;

receiving a fingerprint of content displayed on an electronic apparatus of a user from the electronic apparatus, wherein the fingerprint of the content is sent by the electronic apparatus based on the content being displayed on the electronic apparatus for a period of time that is greater than a predetermined period of time;

determining a first broadcast channel corresponding to the content by comparing the fingerprint of the content and the broadcast fingerprint of the image of each of the broadcast channels;

determining, based on a broadcast schedule of the first broadcast channel, whether a replacement target existing advertisement is scheduled to be broadcasted in the electronic apparatus; and transmitting a replacement advertisement to the electronic apparatus based on a start point of the replacement target existing advertisement when the replacement target existing advertisement is scheduled to be broadcasted in the electronic apparatus, wherein the fingerprint of the content is included in a plurality of fingerprints of the content, wherein the plurality of fingerprints of the content are extracted at regular intervals, and wherein the period of time is determined by counting a number of sequential fingerprints of the content from among the plurality of fingerprints of the content which correspond to the first broadcast channel.

20. An electronic apparatus comprising:

a communication interface;

a display;

a memory configured to store one or more instructions; and a processor configured to execute the one or more instructions stored in the memory, wherein, when executed, the one or more instructions cause the processor to:

extract a plurality of fingerprints of content displayed on the display;

recognize, based on the plurality of fingerprints, a first broadcast channel corresponding to the content displayed on the display;

determine, based on the plurality of fingerprints, a period of time during which the first broadcast channel is output on the display;

based on the period of time being greater than a predetermined period of time, request a broadcast fingerprint of the first broadcast channel from a server;

in response to determining, based on the broadcast fingerprint, that a broadcast schedule of a replacement target existing advertisement is included in a broadcast schedule of the first broadcast channel, download a replacement advertisement from the server based on a start point of the replacement target existing advertisement; and reproduce the replacement advertisement at an advertisement time of the replacement target existing advertisement of the first broadcast channel, wherein the one or more instructions further cause the processor to:

in response to an execution screen for control of the electronic apparatus being called, display the execution screen as overlapping an image of the replacement advertisement, wherein the execution screen comprises a first execution screen portion and a second execution screen portion, and wherein the displaying of the execution screen comprises displaying the second execution screen portion as overlapping the first execution screen portion, and displaying the first execution screen portion and the second execution screen portion as overlapping the image of the replacement advertisement.

* * * * *